United States Patent

Antognini et al.

Patent Number: 5,377,337
Date of Patent: Dec. 27, 1994

[54] METHOD AND MEANS FOR ENABLING VIRTUAL ADDRESSING CONTROL BY SOFTWARE USERS OVER A HARDWARE PAGE TRANSFER CONTROL ENTITY

[75] Inventors: James Antognini, White Plains; Glen A. Brent; Thomas E. Cook, both of Red Hook; Thomas J. Dewkett, Staatsburg; Joseph C. Elliott, Hopewell Junction; Francis E. Johnson; Casper A. Scalzi, both of Poughkeepsie; Kenneth R. Veraska, Millerton; Joseph A. Williams, Poughkeepsie; Harry M. Yudenfriend, Wappingers Falls, all of N.Y.

[73] Assignee: International Business Machines Corporation, Armonk, N.Y.

[21] Appl. No.: 73,815

[22] Filed: Jun. 8, 1993

[51] Int. Cl.⁵ .................... G06F 13/14; G06F 9/30
[52] U.S. Cl. ............................. 395/375; 395/800; 364/239.4; 364/242.2; 364/256.3; 364/262.5; 364/946.3; 364/DIG. 1; 364/DIG. 2
[58] Field of Search ........................ 395/800, 375

[56] References Cited

U.S. PATENT DOCUMENTS

| | | | |
|---|---|---|---|
| 4,246,637 | 1/1981 | Brown et al. | 395/275 |
| 4,272,819 | 6/1981 | Katsumata et al. | 395/400 |
| 4,277,826 | 7/1981 | Collins et al. | 395/400 |
| 4,371,932 | 2/1983 | Dinwiddie, Jr. et al. | 395/275 |
| 4,373,179 | 2/1983 | Katsumata | 395/400 |
| 4,445,176 | 4/1984 | Burk et al. | 395/200 |
| 4,476,524 | 10/1984 | Brown et al. | 395/325 |
| 4,564,903 | 1/1986 | Guyette et al. | 395/425 |
| 4,630,196 | 12/1986 | Bednar, Jr. et al. | 395/200 |
| 4,646,230 | 2/1987 | Eguchi | 395/400 |
| 4,797,812 | 1/1989 | Kihara | 395/400 |
| 4,843,541 | 6/1989 | Bean et al. | 395/275 |
| 4,930,065 | 5/1990 | McLagan et al. | 395/275 |
| 5,008,811 | 4/1991 | Scalzi et al. | 395/400 |
| 5,031,091 | 7/1991 | Wakatsuki et al. | 395/275 |
| 5,095,420 | 3/1992 | Eilert et al. | 395/400 |
| 5,136,698 | 8/1992 | Okamoto | 395/375 |
| 5,159,677 | 10/1992 | Rumsam et al. | 395/425 |
| 5,175,825 | 12/1992 | Starr | 395/325 |
| 5,237,668 | 8/1993 | Blandy et al. | 395/400 |
| 5,269,009 | 12/1993 | Herzl et al. | 395/425 |
| 5,276,815 | 1/1994 | Nakashima et al. | 395/275 |

OTHER PUBLICATIONS

"Advanced DMA Coprocessor for 32-bit Microsystems", Microprocessors and Microsystems, vol. 13, No. 6, pp. 413–420, Jul. 1989.
"Hardware Switch for DMA Transfer to Augment CPU Efficiency", Microprocessors and Microsystems, vol. 7, No. 2, pp. 117–120, Apr. 1983.

Primary Examiner—Robert B. Harrell
Assistant Examiner—Timothy L. Philipp
Attorney, Agent, or Firm—Bernard M. Goldman

[57] ABSTRACT

Provides a software-to-software interface and a software-to-hardware interface between software users and a hardware ADM facility (ADMF) in a data processing system. Such software user presents only virtual addresses to the software-to-software interface in a MSB list. The user list defines virtual address spaces, including a "hiperspace", in a manner that represents physical backing media as different random-access electronic storages, such main storage (MS) and expanded storage (ES). The real data transfers are within or between the backing storages. The user list is transformed into an ADM operation block (AOB), which is assigned an ADM UCB in a UCB queue which is associated with an ADM subchannel. The software-to-hardware interface generates an ORB, containing the AOB address, as an operand of a SSCB instruction which is executed to queue the associated subchannel onto one of plural co-processor queues in the ADMF. The ADMF uses the AOB to perform the requested page moves, and generates an interruption upon completion of each request which is sent to the hardware-to-software interface to remove the associated ADMF request from the ADM software request queue and free the associated ADM UCB for use by another user request.

20 Claims, 18 Drawing Sheets

FIG. 11

| | |
|---|---|
| LENGTH | COMMAND |
| MSB OFFSET | STORAGE KEYS |
| | |
| | |

| EXCEPTION FLAGS | PAGE COUNT |
|---|---|
| | ERROR MSB OFFSET |
| TOTAL PAGE COUNT FOR MOVED PAGES ||
| SOURCE ADDRESS ||
| DEST. ADDRESS ||
| | |

0                                           31

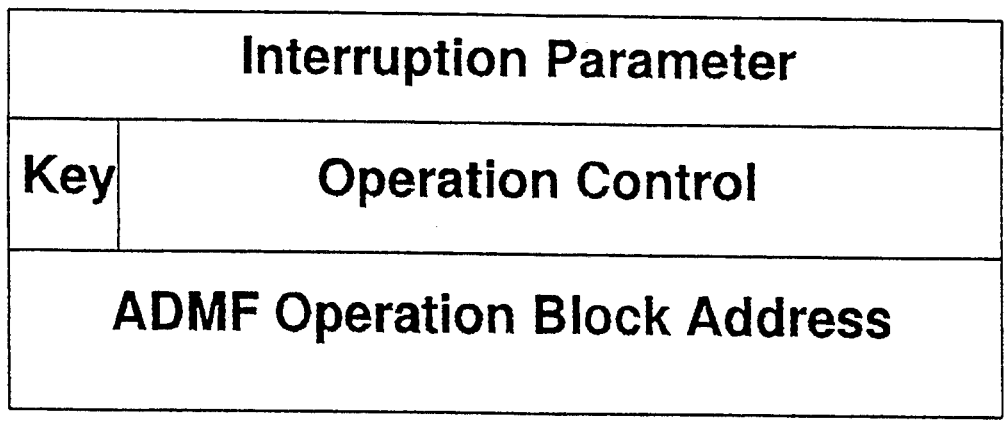
FIG. 15 ADMF ORB

| Subchannel Status Word (ADMF SCSW) |
|---|
| Extended Status Word (ADMF ESW) |
| Extended Control Word (ADMF ECW) RESERVED |

0                                                                                       31

FIG. 16  ADMF IRB

| Key | FLAGS | CONTROL |
|---|---|---|
| AOB Address ||| 
| STATUS |||

0                                                        31

FIG. 17    ADMF SCSW

METHOD AND MEANS FOR ENABLING VIRTUAL ADDRESSING CONTROL BY SOFTWARE USERS OVER A HARDWARE PAGE TRANSFER CONTROL ENTITY

INTRODUCTION

The invention relates to how page move requests required by programs in a data processing system are communicated to a hardware/microcode data move facility (called an ADM Facility) in the system, and how the completions of the requests by the facility are communicated back to the programs. Data is copied in page units by the ADM Facility between, or in either of, main storage (MS) and expanded storage (ES) in the system.

INCORPORATION BY REFERENCE

This specification incorporates by reference into subject specification the following prior-filed patent applications:

U.S. Pat. No. 5,237,668 (PO9-89-018), application Ser. No. 07/424,797 filed Oct. 20, 1989 entitled "Process Using Virtual Addressing in a Non-Privileged Instruction to Control the Copying of a Page in or between Multiple Media", assigned to the same assignee as the subject application.

U.S. application (PO9-90-030), Ser. No. 07/816,917 filed Jan. 3, 1992 entitled "Asynchronous Co-processor Data Mover Method and Means", assigned to the same assignee as the subject application.

U.S. application (PO9-92-063), Ser. No. 08/012,187 filed Feb. 8, 1993 entitled "Load Balancing, Continuous Availability and Reconfiguration Control for an Asynchronous Data Facility", assigned to the same assignee as the subject application.

BACKGROUND

Expanded Storage (ES) is an all electronic random-access storage level in the storage hierarchy of a data processing system between the program execution storage level (main storage) and the electro-mechanical disk drive storage level. The primary advantage of ES is that it ran transfer its stored data to/from main storage (MS) much faster than can a disk drive. ES has an analogy to an electronic disk.

MS and ES are distinguished by each having a different type of absolute addressing structure. The MS addressing structure uses byte addressing units, and ES addressing structure uses page addressing units which contain 4096 bytes in S/390 machines but may be more or less in other machine architectures. MS and ES may be packaged in the same or different physical memory packages.

ES is a shared resource in the computing system, and its allocation has been controlled by the operating system (OS) control program which manages system operations, for example the IBM Multiple Virtual Storage (MVS) Operating System for S/370 and S/390 mainframes.

System efficiency is significantly improved by storing data on ES (instead of on a hard disk) when the data is going to be required soon by a program. The use of ES has been found to significantly improve the operating efficiency of a system, for example, when the data results of one program are stored in ES for use by a next program in a sequence of programs. For example, a billing program may generate invoices to be sent to customers, and the invoice results contain data used by a subsequently executed inventory updating program to update the inventory of a business by deleting invoiced items from the inventory, which is followed by an ordering program which uses the results of the inventory program to generate orders to vendors for replacement of the sold inventory, etc. The time for executing the sequence of programs has been greatly reduced by storing program data results on ES instead of on hard disk, resulting in faster computer operations for a business without any increase in the processor speed of the computer.

Since many programs use virtual addressing directed to MS, it is important that ES be usable automatically and transparently by a program using virtual addresses directed to MS. ES addresses are indirectly provided through MS page table entries having an associated external page table for ES. This manner of ES addressing through MS virtual addresses allows ES to be accessed indirectly through a requested MS virtual address in an instruction, wherein the requestor may not be aware that ES is being used. This indirection is provided through the MS translation process in translating requested MS virtual addresses in instructions.

An MS virtual address is translated to an MS real storage address by using the well-known set of segment and page tables initialized and managed by the operating system. Use of virtual addresses protects the system by not allowing its users to know where the virtually-addressed data actually resides in the real storage of the system.

Virtual address translation is often performed by using a hardware Dynamic Address Translation facility generally called DAT) which performs address translations in an S/370 or S/390 data processing system. The DAT facility does an address translation by first obtaining a Segment Table Designation (STD) that locates a Segment table and specifies its length. After the segment table is located using its STD, a Segment Index (SI) in the virtual address (being subjected to the address translation process) is used as an index in the segment table to find an entry containing a page table origin (PTO), which is used to access a page table. Then a Page Index (PI) in the virtual address is used as an index in the page table to obtain the address of a required page table entry (PTE) which, if its valid bit is set on, contains the real address of a corresponding page frame in main storage. The page frame is accessed to obtain the virtually addressed data.

For data integrity and security reasons, the STD and translation tables are not available to programs other than the Operating System (OS). Hence, only the OS and hardware are involved in the address translation operations. After each translation is completed, the absolute address of the addressed page frame is usually stored in a Translation Lookaside Buffer (TLB) from which it can be obtained much faster than again performing the involved translation process for later requests to the same page of data, The term, data, is herein inclusive of programs in storage which are not currently in an executable state.

The virtual concept of "hiperspaces" has greatly facilitated the use of ES by programs using virtual addresses in a system. Hiperspaces are virtual address spaces backed by data in real page frames in ES or in DASD. The page frames in a hiperspace are addressed indirectly through virtual addresses by the executing programs, in response to the translation of the virtual addresses.

When virtual address spaces, including virtual data spaces, are assigned to a program in the IBM MVS operating system, no real storage space (e.g. page frames in MS or ES) is assigned to the address space until a page in the virtual space is involved in program execution, and then only the virtual pages accessed by the program are assigned backing real page frames in MS and/or ES. Thus, when a program requests an instruction or data at a virtual address, an MS page frame assignment is then made through the virtual address translation process which finds a free page frame in MS, which address is placed in a Page Table Entry (PTE) having its valid bit set to a valid state. A corresponding ES page frame assignment may be made through ES assignment bits and flags in the same PTE.

A page is moved from ES to MS by copying the data in an ES page frame (at the source location) to an MS page frame (at the destination location), or visa versa, usually without erasing the original page at the source location.

Data has been moved between ES and MS in a number of ways taught in prior filed patent applications. One way is by using a move page instruction (MVPG) described and claimed in prior-cited application Ser. No. 07/424,797 (PO9-89-018), which teaches how MS virtual addresses can be used to transfer a page of data between a source location and a sink (destination) location in either direction within or between two random access electronic storages in a data processing system such as MS and ES. In that application, the source and sink locations may be in the same electronic medium or in different electronic media, of which the most important media to date have been the main storage (MS) and expanded storage (ES) of a data processing system.

The virtual addressing capability in the MVPG instruction of application Ser. No. 07/424,797 significantly differed from the invention in U.S. Pat. No. 4,476,524 (Brown et al). Brown's pagein and pageout instructions moved data between MS and ES using real MS and ES addresses. Brown's instructions did not have virtual addressing capability.

Synchronous page transfer processes were described in application No. 07/424,797 and Brown U.S. Pat. No. 4,476,524. A synchronous operation requires the requesting processor to wait until the page transfer is completed before it can process its next instruction.

An Asynchronous Data Mover Facility (ADM) using a single ADMF co-processor is described and claimed in prior application Ser. No. 07/816,917 (PO9-90-030). This ADMF facility can continuously transfer pages of data between source and sink locations at the request of the central processors in a data processing system. A single processor request can specify that any number of pages be moved from source locations to sink locations in the same electronic medium or in different electronic media, which may be MS and ES. Asynchronous operation means the requesting central processor can process other instructions while the ADMF co-processor is moving the requested pages. That is, the requesting processor can perform other work independently of the requested page transfers being done by the ADMF co-processor. Thus, the ADMF co-processor controls the moving of the requested pages in parallel with the execution of programs by the central processor.

A significant improvement in an MS/ES data mover facility (ADMF) is described and claimed in a following application serial number application (PO9-92-063) Ser. No. 08/012,187. This application teaches how a plurality of co-processors may be simultaneously processing ADMF requests in a single ADM Facility, how the ADMF work may be redistributed among the co-processors to efficiently perform the ADMF work, and how an ADM Facility can continue to operate even though one or more of its co-processors failed. This application also teaches how the co-processors in an ADM Facility can concurrently handle both ADMF requests and I/O requests from the central processors in a system.

SUMMARY OF THE INVENTION

This invention provides a software-to-software interface and a software-to-hardware interface between software users and a hardware ADM Facility (ADMF) in a data processing system. The software users include application programs, or programming subsystems which have a need to use an expanded storage (ES) in the system to improve system performance. The users may be implicitly using the "hiperspace" type of virtual address space, previously discussed herein to access ES, as well as other types of virtual address spaces, such as data spaces and address spaces.

Each user of virtual spaces may specify them using virtual address space identifiers, which in the S/390 architecture are called ALETs (Access List Entry Tokens). When an ALET is used in program execution, it is translated by the system to a Segment Table Description (STD).

Each virtual address may be thought of as being defined by an ALET or STD and an OFFSET. The ALET or STD identifies the address space. The OFFSET represents the number of contiguous bytes from the beginning of the address space to the start of the addressed object in the address space. In MS, the addressed object is a byte; in ES, the addressed object is a page.

Each user request to the software-to-software interface may specify any number of page move specifications, up to some arbitrary number K in a list generated by the user which is passed to the software-to-software interface. Each item in the list specifies a source address, a destination address, and a number of contiguous pages to be moved from the source address to the destination address. The source and destination virtual addresses for a data move operation may be in two different address spaces, or they may be within the same address space. Contiguous virtual pages have consecutive virtual addresses. The real page frames assigned to consecutive virtual page addresses may be non-consecutive (scattered) in real storage, MS or ES.

The invention converts this list of move requests into a series of Move Specification Blocks (MSBs) which instruct the ADMF hardware facility to perform the specified moves. The series of MSBs are packaged as part of the ADMF Operation Block (AOB), in which control information is added, and which is made part of the software-to-hardware interface. Thus, each AOB includes: source and destination addresses, storage keys, access list entry tokens (ALETs) or their STDs (when virtual addressing is used), authorization indicators, and other parameters.

Before operation of the ADMF hardware can begin in a computer system, the software-to-software interface and the software-to-hardware interface must be set up and initialized.

A first requirement for setting up the ADMF interface structure is to set up N number of ADMF control blocks (called UCBs) for representing subchannels (SCHs) used for intercommunication between the ADMF hardware facility and the operating system software. N is an integer of one or more which is dependent on the ADMF request workload expected, the number of ADMF processors in the ADM Facility, the speed of the ADMF co-processors, etc. Generally, N is chosen to be greater than one and equal to or greater than the number of ADMF co-processors in order to obtain the most efficient operation of ADMF hardware. Generally, the higher N is made the more efficient is the ADMF operation up to some practical limit beyond which no further gains will occur. Thus, diminishing returns occur after N reaches some particular value for a given ADM Facility. N is the number of concurrent requests that can be outstanding between the software and hardware at any time.

The ADMF subchannels (ADMF SCHs) represent the hardware ADMF entity to the software ADMF interfaces in the system. Each ADMF SCH is structured similarly to the well-known I/O SCH used in the IBM ES/9000, 3090, and prior S/370 systems. But the ADMF SCH adds novel control fields not found in the prior I/O SCHs, such as the definition of a new type of SCH to indicate an ADMF SCH. Each SCH definition (both for I/O and ADM) is located in a protected system storage of the computer system, for system integrity reasons in S/370 and S/390 computers, which is only accessible to microcode executable by processors of the system (and is not accessible to software).

However, this invention is independent of whether SCHs are encoded at the software or microcode level, and can operate with its SCHs encoded and operated at either the microcode or software level in a non- S/370 or non-S/390 computer environment. (SCHs are encoded at the microcode level in the S/370 or S/390 computer environment.) But it is expected that the best long term system operation will occur when system integrity considerations for SCHs are fully supported, to prevent, for example, a software wild store into an SCH which may cause the system I/O operations to fail.

Nevertheless, the system integrity issue in the implementation of this invention affects its complexity, e.g. particularly in how much overhead is required in handling the ADMF SCHs. For example, a high-integrity system uses layers of complexity to allow users to only indirectly change SCHs. But a low-integrity system may allow users to directly change SCHs (avoiding layers of complexity) and lowering apparent (but not necessarily real) system costs.

Consequently, this invention can also be used with other computer architectures having less system integrity (not used by the preferred embodiment) which allow operating system software to directly access SCHs. Then, the processes used by this invention are correspondingly simplified, because no UCBs are needed due to allowing direct accessing of SCHs by the software.

Accordingly, N number of ADMF SCHs are initially generated in a system in a manner similar to the way conventional I/O SCHs are generated, except that a new type of SCH (the ADMF type) is provided and set to indicate the ADMF type. A value of zero in the type field indicates it is the I/O type. Although SCHs are generated when the system is initialized, new I/O and ADMF SCHs could be dynamically generated later after the system has been running. However, dynamically generated SCHs might not be made operational until the system has its next initial program load (IPLed) operation.

N number of ADMF SCHs are generated before the ADMF software interfaces are made operational. The preferred embodiment uses ADMF SCHs structured at the microcode level in a system, and uses special instructions that allow the software to request the microcode to read and change some (but not all) of the fields in an identified SCH. In the IBM S/370 and S/390 computer architectures these special instructions include, for example, the "Store SCH" and "Modify SCH" instructions, which are defined in the IBM Enterprise Systems Architecture/390 Principles of Operation (form number SA22-7201-00). They allow the software to request from microcode a copy of SCH information, and to change, some (but not all) of the fields in the SCH control block. The "Store SCH" instruction stores a software control block, called a SCHIB (SubChannel Information Block). It contains predetermined information obtained from an identified SCH. The "Modify SCH" instruction operates in the reverse direction to copy information from a SCHIB, that has been modified by the operating system, into some fields in an identified SCH.

The SCH's are considered to be below the user interface, due to not being addressable by software, and the SCHIBs are considered to be above the user interface where they can be addressed by software. The contents of a SCHIB after a "Store SCH" instruction indicates the type of the addressed SCH, e.g., I/O, or ADMF.

The software sets up an ADMF UCB (Unit Control Block) for each ADMF SCH, to enable the software to represent each ADMF SCH. An ADMF SCH is a communication vehicle between hardware and software for the invocation and termination of ADMF operations. It is a common identifier that can be used to uniquely identify a particular ADMF operation in hardware-software intercommunication. By having a set of UCBs (Unit Control Blocks) accessible to the software, they can make and handle associations between user requests and the SCHs before the ADMF SCH is accessed for execution by the hardware ADMF.

In the initial building of the ADMF UCBs by the software, ADMF SCHIBs (SubChannel Information Blocks) are used by the software for detecting each of the ADMF SCHs, due to the previously-described integrity aspects of the S/390 computer architecture used by the preferred embodiment described herein. In other architectures, the SCHs may be directly used to eliminate the need for UCBs as used with this invention.

Thus, a "Store SCH" (STSCH) instruction is used to query a SCH. The type field in the addressed SCHs is tested in the identified SCHIB (which is used as a buffer for subchannel information needed for building a corresponding UCB). Every SCH in the system is queried by looping the STSCH instruction through every possible SCH identifier, and testing the SCH type field received in the SCHIB for the ADMF type. Most SCHs in a system are likely to be the type, and they will have I/O UCBs created for them. This will not be discussed here, since only detected ADMF UCBs are of interest to this process.

Each built ADMF UCB is put on a software ADMF UCB queue from which the contained UCBs can later be assigned to represent ADMF work requests to the hardware facility. The first generated UCB is made the anchor of the UCB queue, and then each subsequently built UCB is chained by a pointer to the next generated UCB. The last UCB in the ADMF UCB queue receives a pointer that addresses the anchor UCB. Thus, each ADMF UCB on the ADMF UCB queue is associated with a different ADMF SCH in the system. The first UCB is also made the anchor of an ADMF Request Queue by putting in it a pointer to the first location for an ADMF Request Element (ARE). The ARE queue represents work requests that are in operation or pending.

After the ADMF UCB queue is built, user ADMF requests may be received by the software-to-software interface, which converts the requests to the previously described AOBs which can be used by the ADMF software-to-hardware interface. Then the ADMF interface software builds an ARE, associates it with the respective AOB, and puts the ARE on the ADMF Request Queue, which is addressed from the anchor UCB.

Each new ADMF request from a user has an ARE put on the ADMF Request Queue and is associated with a respective AOB representing the user's ADMF request. The ARE is chained into the queue by means of address pointers in the AREs.

Then the ADMF software controls assignment of any available UCB on the ADMF UCB queue to the ARE and AOB representing the request. This ADMF UCB is associated with a SCH via a SCH number contained in the ADMF UCB. An ORB (Operation Request Block) is later built by the ADMF hardware interface software to contain the associated AOB address. The ORB is the operand of a "start subchannel" (SSCH) instruction. The SSCH instruction is executed to associate that SCH with the AOB by containing the AOB address in the ORB. The execution of the SSCH instruction causes the hardware ADMF to queue that SCH on a pre-assigned ADMF internal queue to start the ADMF performance of the associated user request. Completion or termination of the hardware operation will be communicated through the addressed SCH.

When the user requested work is completed by the ADMF hardware, it signals an I/O interruption to the CPUs (Central Processing Units) in the system, and stores an "interrupt parameter field" of the associated ADMF SCH into a predetermined field in MS known to the OS. On receipt of the interruption, the OS issues a Test Subchannel instruction specifying an Interruption Request Block (IRB) shown in FIG. 16. The definition of the Subchannel Status Word (SCSW) which is part of the IRB, has been modified to support ADMF as well as I/O operations. The SCSW is shown in FIG. 17. The ADMF SCSW is defined to report the AOB address of the last operation on the addressed SCH.

The order of completion of communicated wore requests by the ADMF is asynchronous with the order of these work requests as sent by the ADMF interface software to the ADMF. Hence, it is important to the operation of this invention that a correct match be made between a work request completed by the ADMF hardware and the same request waiting in the ADMF software. This requires the interruption parameters to provide information to the OS ADMF software for addressing the associated UCB, ARE and AOB in order to locate and remove the ARE from the ADMF software queue, and to free the associated UCB so that it is available for selection for another user request.

The information in an ADMF interruption and the information from the associated Test SCH instruction includes, for example: 1. the number of the subchannel which caused the interruption, 2. the associated UCB address, and 3. the address of the AOB.

The ADMF hardware facility makes some of this interruption information available to OS software by putting it into a predetermined memory location when the interruption is signalled and the rest is part of information provided by Test SCH. The OS software receives the interruption parameters and uses the UCB address to locate the UCB (associated with the request for which the completed ADMF work was done), and the associated ARE is then removed from the ADMF software request queue and the associated UCB is made available for assignment to another software work request.

The interruption-handling OS software makes the work unit, that generated the now completed request, ready for dispatch on one of the processors of the CEC. Evaluation resumes in the OS service that handles requests made through the software-to-software interface. It then examines the ARE queue to determine if there is a pending work request that can be assigned to the UCB on which the earlier request had just completed. If so, the invocation process is performed for that pending request.

Asynchronous to the above process, but subsequent to being marked ready for execution as described above, the work unit of a completed ADMF operation will be dispatched for execution on a processor of the CEC. It examines the AOB Response Block for normal or abnormal status and indicates to its caller by condition code whether or not exception handling is required.

Therefore, the ADMF software processes provide a plurality of control blocks with pointer addresses to enable an SCH-to-UCB-to-AOB-to-ARE association. The SCH-to-UCB association may be made by the initial build process. The AOB-to-ARE association may be made at the time the ARE is obtained to add the AOB to the work queue. The UCB-to-ARE-to-AOB association may be made when the ADMF request is assigned to a UCB for execution. These associations may be made by writing an address into an appropriate pointer field in each of these control blocks. When an operation has completed the associating pointers may be either erased, or marked invalid, in a control block to free the control block for use by a future ADMF request to the software interface.

The execution of page moves in engines outside of the CPUs requires a new form of synchronization to prevent the IESBE instruction from invalidating a virtual address that is backed by ES while the page is being moved by an ADMF co-processor. Conditions exist that also require that the ADMF co-processor know that all paging activity is currently stopped in the system in order to restore control information. A shared system storage location is used to signal all processors when any CPU or ADMF co-processor is actively moving a page. The same location is also used to signal all processors and co-processors when any CPU is executing an IESBE instruction. Also, when an ADMF co-processor requires all paging activity to stop, it signals using this same shared location to all CPUs and ADMF co-processors to stop all paging activity. The synchronization occurs under the following rules: No processor or co-processor starts a page move if any co-processor has requested that moves stop, either an IESBE or co-processor request; and once a move is signaled, no IESBE or co-processor request to stop paging is honored until all page moves in progress have completed. In the preferred embodiment, this synchronization occurs before any single page move. Where ADMF is in the process of performing a large multipage move, it allows the synchronization to occur after each single page moved.

The invention provides an interface structure for servicing user or subsystem program data movement requests that maintains the hierarchical responsibilities and authorities of the operating elements involved in the full process. An operating system service, called IOSADMF, is provided which offers an application interface for user or subsystem requests for ADMF operation. This service program converts the input parameters into the form expected by the ADMF functional engines. In addition, it has the additional authority and capability required to convert the ALET's of virtual address spaces (including hiperspaces) to STDs for ADMF use in translating virtual addresses. As a trusted component in this structure, it provides the storage keys that ADMF will use in making its storage accesses.

In the preferred embodiment, all I/O operation invocations in the system are performed in a centralized programming component of the operating system, the input/output supervisor (IOS). This allows sharing of devices, hardware data paths, and other capabilities among using programs and subsystems, where such sharing is desirable. For ADMF, the IOS component maintains a single work queue of requests from all users of ADMF, and assigns these requests in FIFO order to available SCH's for communication to the ADMF hardware facility. It issues the SSCh instruction to the ADMF SCH, and processes the completion interruption for each request. This allows it to share the available ports to the ADMF (the ADMF SCH's) among all users. It communicates completion of requests to the software interface service. This communication is managed through execution of the IOSADMF service under the work unit control block of the calling program, either a task control block (TCB) or a service request block (SRB). When IOS is called, the executing unit of work is suspended until the ADMF work request is finished. When IOS subsequently receives and performs its processing for a request completion, it makes the execution control block ready for dispatch, and the service will subsequently resume execution on one of the processors of the CEC. It will examine the ending functional status returned by ADMF about the operation, and communicate completion status to the calling program by returning to it at the instruction following the original call to the service. A return code is provided to indicate whether the operation was successful. The levels of interface in this complete process are shown in FIG. 18 which will be further described below.

SUMMARY OF THE DRAWINGS

FIG. 11 shows the structure of an ADMF AOB Header.

FIG. 12 shows the structure of a ADMF Response Block (ARB).

FIG. 15 shows the structure of a ADMF Operation Request Block (ORB).

FIG. 16 shows the structure of a ADMF Interruption Response Block (IRB).

FIG. 17 shows the structure of a ADMF SubChannel Status Word (SCSW).

FIG. 18 is a diagram representing the levels of interface that a request for page movement using ADMF must progress through.

DETAILED DESCRIPTION OF THE INVENTION

Preferred Embodiment Attributes

Figure 13:
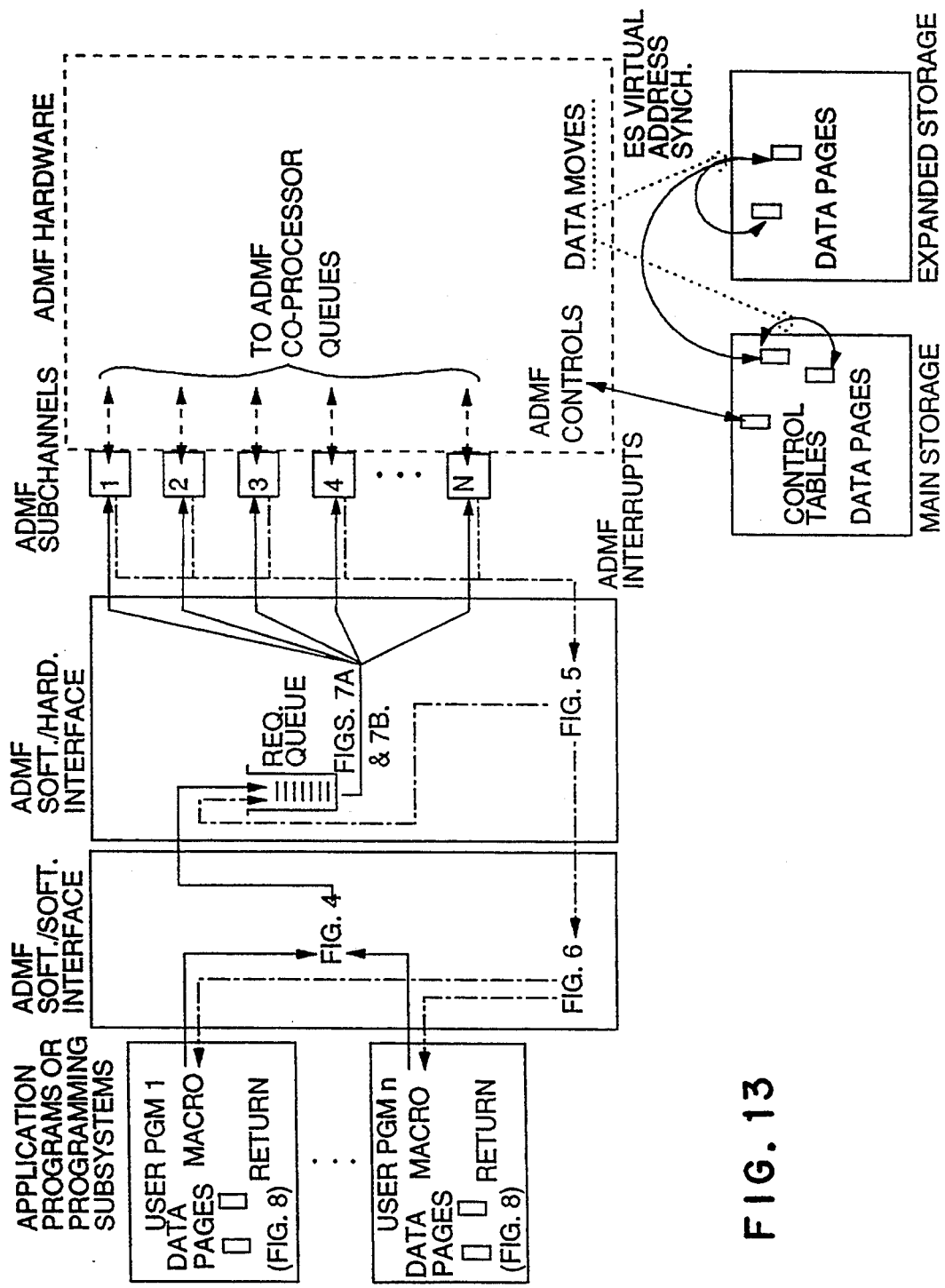
FIG. 13 is a diagram of the overall processes used by the preferred embodiment.

The preferred embodiment of an ADMF software-/hardware subsystem is represented in FIG. 13, which is a diagram of a combination of processes shown in detail in FIGS. 4–8. This combination of processes performs the overall function of accepting all user ADMF requests in virtual address :form for moving real pages of data in or between ES (expanded storage) and MS (main storage), passing all requests for execution to the ADMF, and managing the removal of ADMF completed requests from the system. These individual processes, and how they operate and interact with each other is described using FIGS. 4–8 in the general context of the overall ADMF function performed by the ADMF software/hardware subsystem in FIG. 13.

Figure 18:
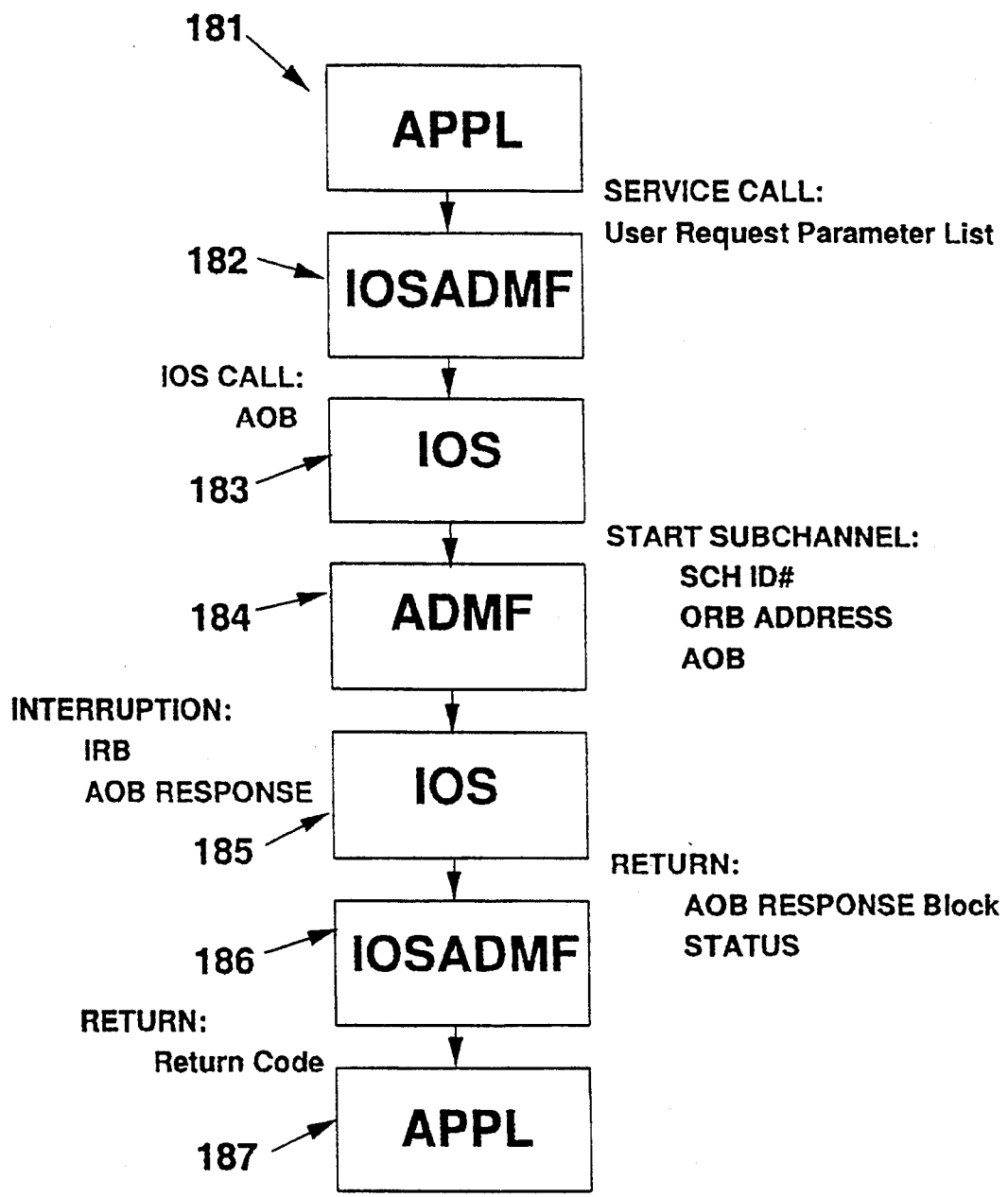

FIG. 18 shows the many levels of interface that exist between executable elements of differing capabilities and authority. Each level adds additional information until a level is reached that has sufficient information to perform the move. When the move is complete, the different levels of interface test and remove information to insulate and protect the integrity of the system. Step 181 shows an application communicating its request to move pages via the User Request Parameter List to Step 182 which represents the IOSADMF service. Step 182 builds the AOB as described in FIG. 4 Step 43, Step 45 and 45A in the form described in FIGS. 9, 10 and 11 and passes the AOB to IOS in STEP 183. Step 183 IOS issues a request to ADMF Step 184 as described in FIG. 7B Step 76B and 76C using a Start Subchannel instruction with the subchannel number associated with the UCB and an ADMF ORB as described in FIG. 15. Once ADMF completes the moves an interruption occurs and passes information back to IOP in Step 185. The information is passed in an IRB described in FIGS. 16 and 17 and an ADMF Response Block described in FIG. 12 is processed by FIG. 5. The IRB information is processed by IOS and only ADMF Response Block information and status are passed back to IOSADMF in step 186. Step 186 examines the ADMF Response Block as described in FIG. 6 Step 62 and returns only a return code to the application in step 187.

Before the ADMF software/hardware subsystem in FIG. 13 can be used, an ADMF UCB (unit control block) queue must be built to identify which SCHs can be used for communication of ADMF requests to the hardware facility. The ADMF UCB queue is built by processes shown in FIGS. 2, 3A and 3B.

Figure 1:
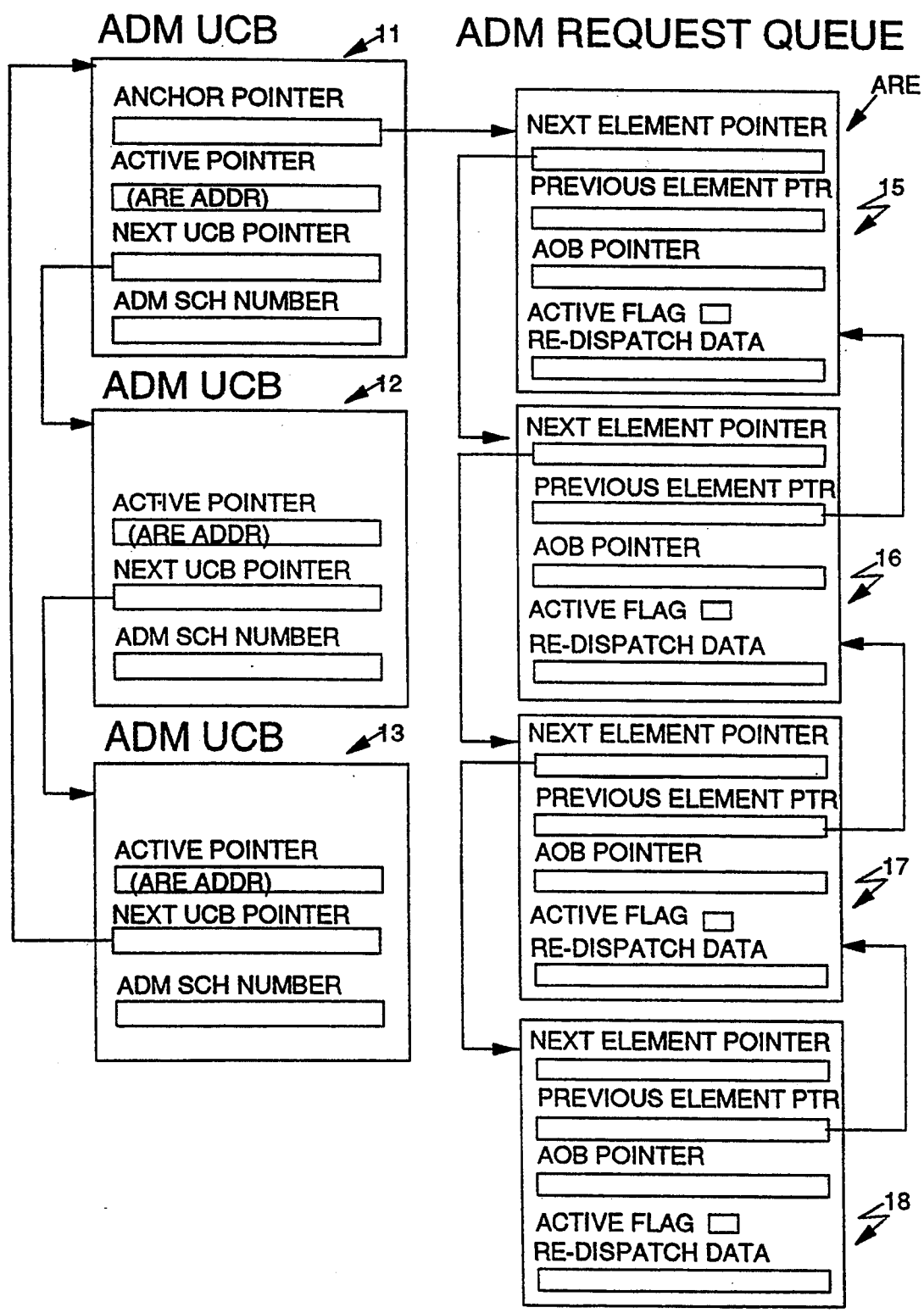
FIG. 1 illustrates the structures of an "ADMF UCB queue" and an "ADMF request queue" located in the software realm of a computer system.

When built, these queues have the general form shown in FIG. 1. The UCB queue has a predetermined number of UCB elements, which remains fixed during the operation of the embodiment. The UCBs in the queue are determined by the initialization process shown in FIGS. 2, 3A and 3B.

Figure 4:
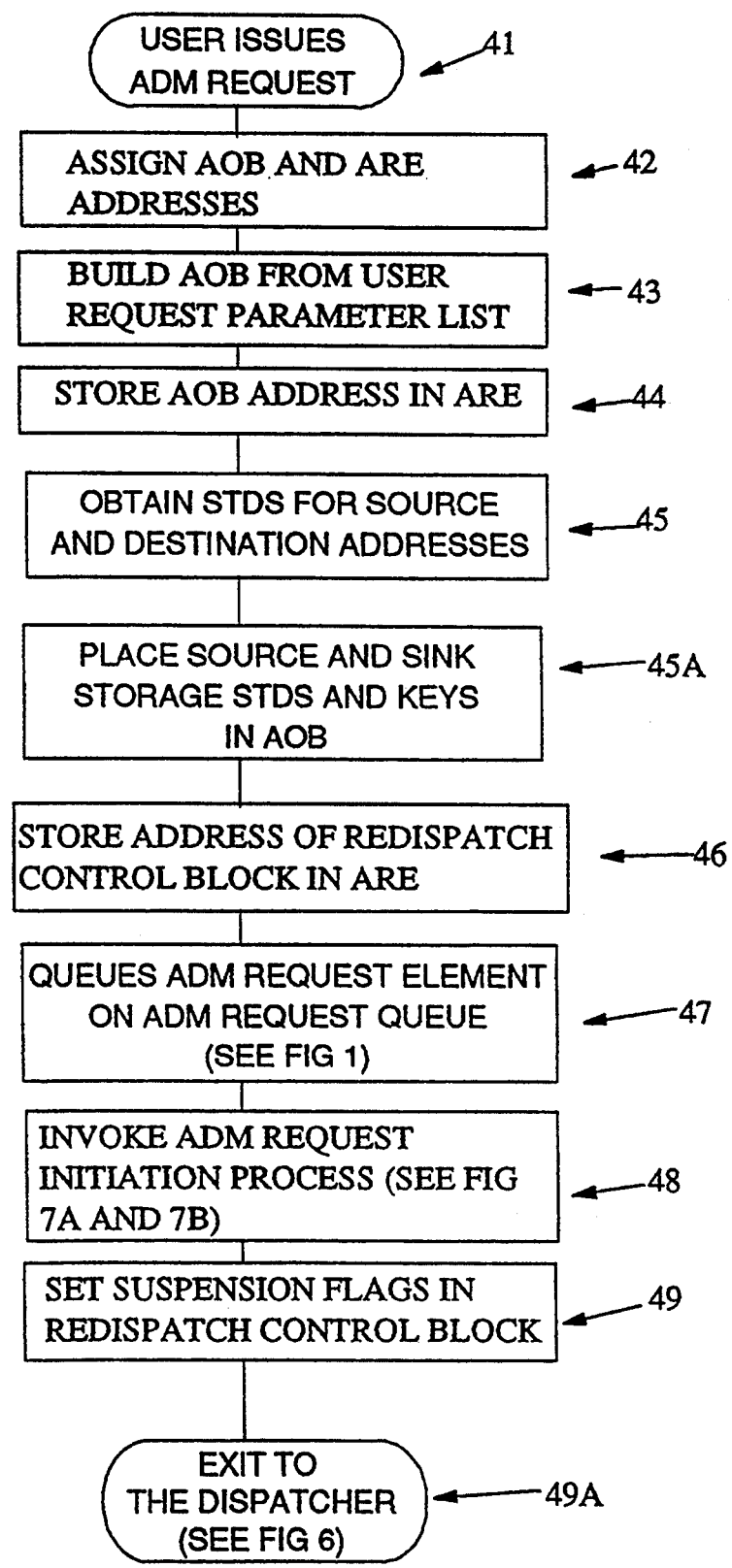
FIG. 4 is a flow chart of a process used in building elements in an ADMF request queue and building associated components, including ADMF Operation Blocks (AOBs) which are built from user supplied software lists (shown in FIG. 8) and are used to define the user requests to the ADMF hardware facility.
Figure 5:
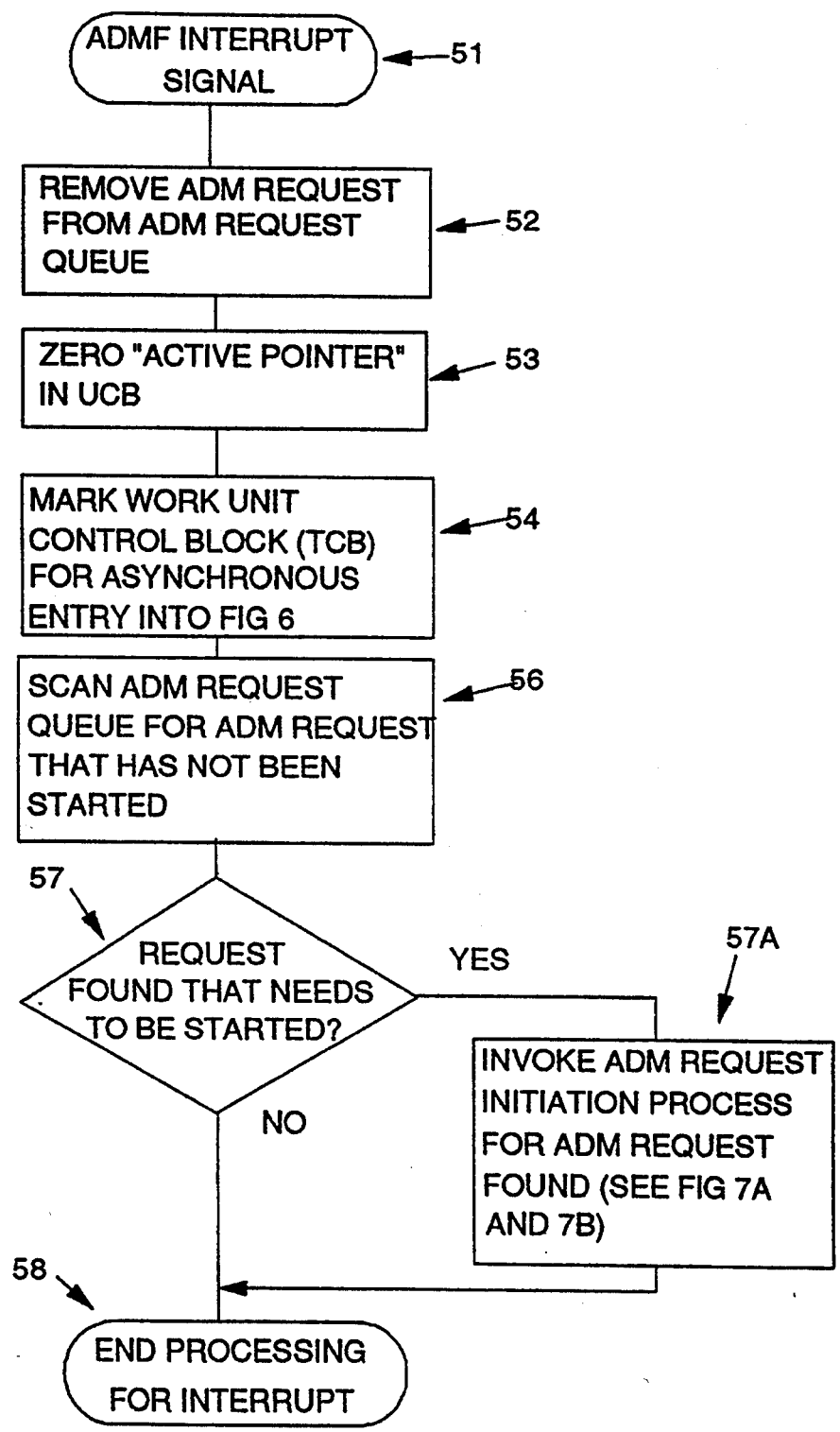
FIG. 5 is a flow chart of a process that responds to a request completion interruption signal from the ADMF hardware facility for removing the associated ARE (ADMF request element) from the ADMF request queue and for freeing an associated UCB so that it is available for assignment to a new user request.

Initially, there are no ADMF Request Elements (AREs) on the ADMF Request Queue, and the number of AREs on the ADMF request queue is continually changing during the operation of the embodiment, as the process in FIG. 4 adds each new ARE on the ADMF request queue whenever a new user request is received, and the process in FIG. 5 deletes each ARE from the ADMF request queue as the hardware ADMF signals the completion of each request.

Figure 2:
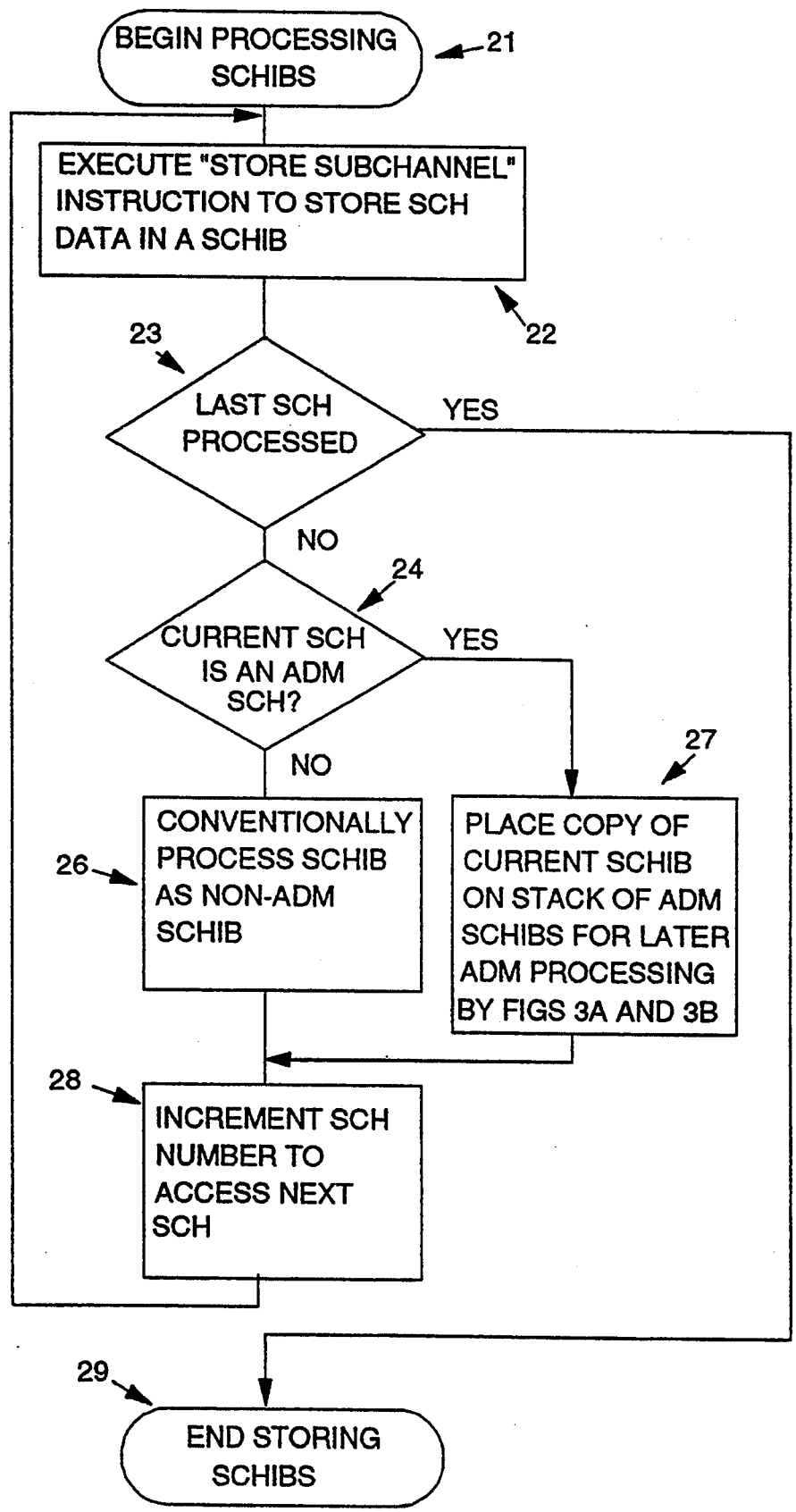
FIG. 2 is a flow chart of a process used to begin the building of a UCB queue involving a process for detecting all ADMF SCHs (Subchannels) in a computer system and building a stack of ADMF SCHIBs (SubCHannel Information Blocks) representing the detected ADMF SCHs.
Figure 3A:
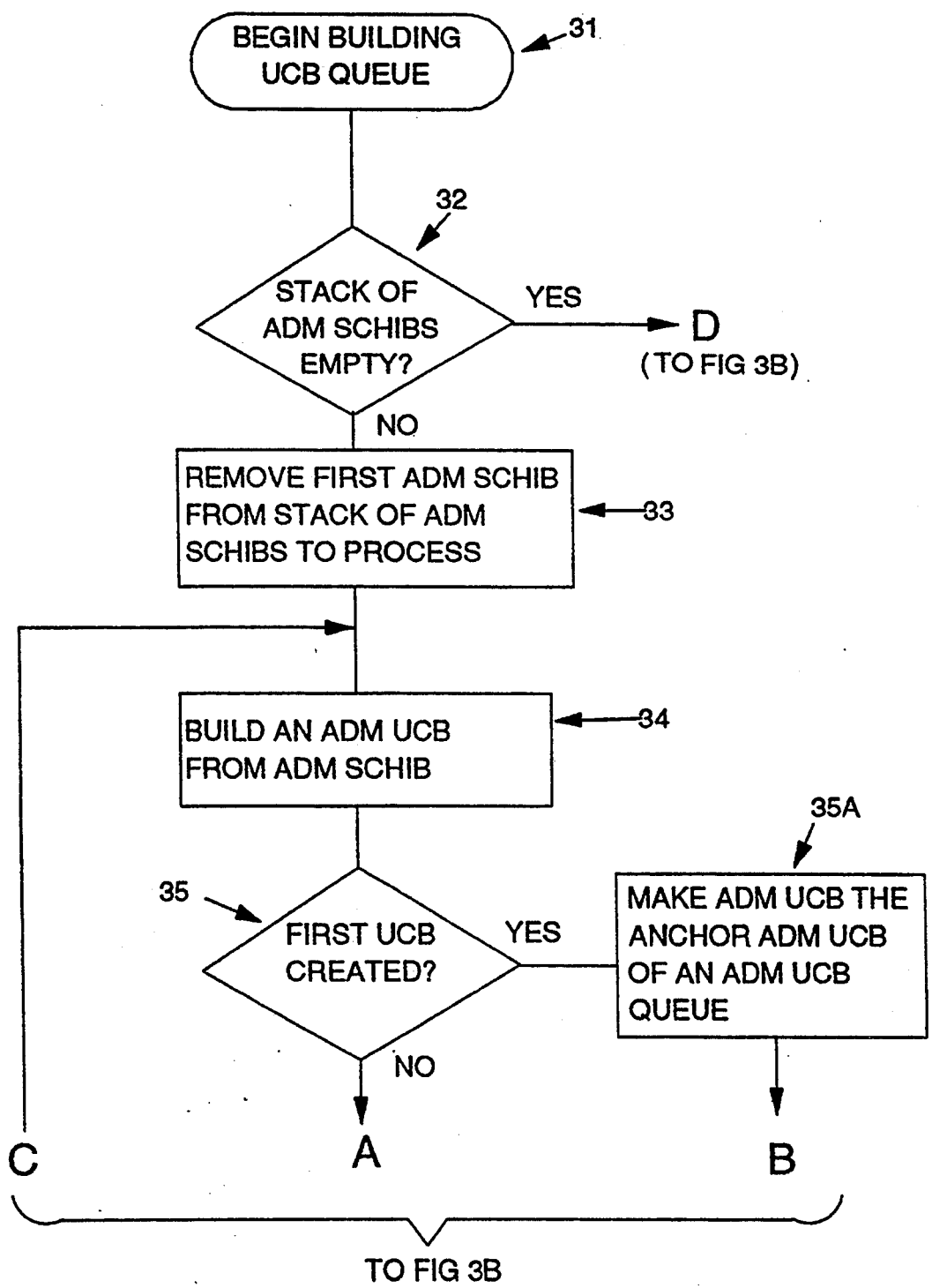
FIG. 3A and FIG. 3B together form a flow chart of a process for building a UCB queue from the stack of ADMF SCHIBs provided by the process in FIG. 2.
Figure 3B:
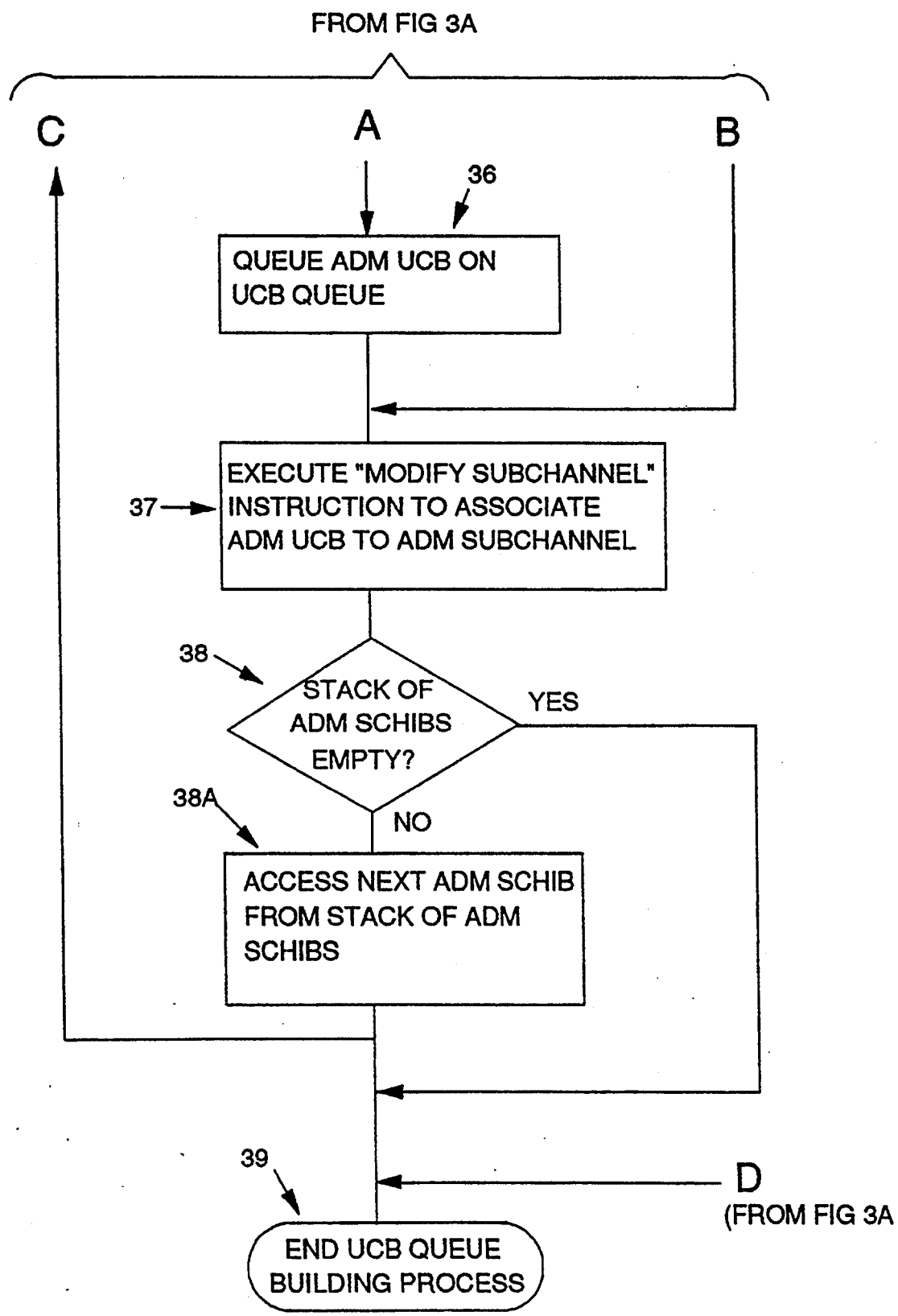

On each initialization of the computer system, the system has the option either of re-executing the processes in FIGS. 2, 3A and 3B for re-building the UCB queue shown in FIG. 1, or after the first building of the UCB queue, of storing a copy of the UCB queue on an external medium and re-loading it into system memory whenever needed without re-executing the processes in FIGS. 2, 3A and 3B. The latter procedure is preferred.

The ADMF software subsystem uses the UCB queue and the ADMF request queue together to handle all ADMF requests provided by all software users of the computer system. Before submitting each ADMF request, each user puts its requests in a particular form meaningful to the user and to the ADMF software subsystem. The ADMF software subsystem then puts each received request in a form which can be sent to and executed by the ADMF hardware subsystem.

FIG. 4 shows a user-to-ADM-request-queue software process that receives each user request and encapsulates it into a respective AOB (ADMF Operation Block), which has a form which can be used by the ADMF hardware to perform the request, after checking the authorization of the requesting user to use the ADMF functions. The process associates the AOB with its user. The OS software provides the storage keys to be used for this request by the ADM hardware to constrain its storage accesses.

The process also generates an ARE associated with the AOB, and puts the ARE on the ADMF request queue. Each ARE is a control block chained into the ADMF request queue by forward and backward pointers contained in the ARE. The AOB is associated with the ARE by putting an AOB pointer in the ARE for locating the associated AOB.

(Although the preferred embodiment uses separate control blocks for the AOB and its ARE, an alternative embodiment may use a single control block for both by including in each AOB the additional information needed to make it also perform as an ARE, such as by including all of the ARE fields in the AOB.)

FIG. 1 shows ADMF UCBs 11–13 on the UCB queue and each UCB having a forward pointer to its next ADMF UCB on the UCB queue The forward pointer in the last ADMF UCB 13 in the queue contains an address to the first ADMF UCB 11 in the queue.

When the first ADMF UCB 11 is built by the processes in FIGS. 2, 3A and 3B, this UCB is also made an anchor element for both the UCB queue and the ADMF request queue. This is done by defining in the first UCB as an anchor pointer which addresses a location provided for the first ADMF request element (ARE) on the ADMF request queue when there are any. In addition to forward and backward pointers, each ARE 15–18 also contains other pointer and flag fields for containing information and associations needed to enable the queues to handle received ADMF requests.

During operation of the UCB queue, each ADMF UCB in the UCB queue is EITHER AVAILABLE (I.E. FREE) OR BUSY. AN ADMF UCB IS free if it is not presently associated (assigned) to an ADMF request. Any free ADMF UCB can be associated with any ARE not yet assigned a UCB.

Each ADMF UCB is a reusable resource, which represents a permanently assigned ADMF subchannel, and which can be associated with any user request for communicating the request to the ADMF. A UCB becomes unavailable (non-free) when it is associated with a particular user request. The unavailable (non-free) state continues for a UCB until the ADMF signals that the associated request has been completed by the ADMF. An unavailable (non-free) UCB again becomes a free UCB as soon as the ADMF software can respond to the ADMF completion signal by removing its associated ARE from the ADMF request queue. Therefore, the UCBs in the UCB queue are continually being reused as new requests are received and old requests are completed by the ADM Facility. The detailed process for using and reusing the UCBs is explained in the descriptions of the ADMF processes in FIGS. 4–7B in this specification. There may be more AREs in the work queue than there are ADMF UCBs. Those not yet assigned to a UCB are pending and will be assigned in turn, as UCBs complete previous requests.

When each user request is assigned to a UCB, an ORB is built by the ADMF software to contain the address of the associated AOB and to identify the subchannel of the ADMF UCB associated with the AOB. The ORB is an operand of an SSCH instruction. The SSCH instruction is executed by conventional OS input output supervisor programs (IOS), such as the IOS program in the IBM MVS operating system which schedules I/O requests.

The execution of the SSCH instruction communicates the request to the hardware ADMF. The ADMF then puts the SCH associated with the UCB of the request on one of the ADMF queue-off-load (QOP) processor queues, which starts the hardware ADMF processing of that request.

In this invention, a plurality of ADMF SCHs may represent the ADMF, and therefore, unlike I/O SCHs which have a one-to-one relationship with I/O devices, ADMF SCH's do not have a one-to-one relationship with a particular ADMF co-processor. However, each ADMF SCH or I/O SCH has a one-to-one relationship to a corresponding software UCB. Therefore, an I/O UCB uniquely represents a different I/O device to the OS, and its corresponding I/O SCH uniquely represents the I/O device to internal code (microcode) at the hardware level in a data processing system. But a plurality of ADMF UCBs may each represent the same ADMF (possibly comprised of multiple off-load engines) to the OS, and all of the corresponding ADMF SCHs represent the same ADMF to internal code (microcode) at the hardware level in a data processing system. A distinction is that the plurality of ADMF UCBs and their corresponding SCHs are needed to represent different user requests to the same ADMF, and this cannot be done by I/O UCBs and their I/O SCHs.

The number of ADMF SCHs (and ADMF UCBs) provided for an ADMF in a particular system is model dependent. Generally, at least one ADMF SCH (and its UCB) is assigned for each co-processor in an ADMF to provide maximum parallel processing of ADMF requests by the ADMF hardware.

The number of ADMF SCHs (and their corresponding ADMF UCBs) available in a particular computer system is related to the waiting time for users attempting to schedule user requests on the "ADMF request queue", since any user making a request will need to wait for an ADMF UCB if no ADMF UCB (and its corresponding ADMF SCH) is available to the request.

Therefore, the actual number of ADMF SCHs (and their corresponding ADMF UCBs) assigned in a particular computer system should be a number sufficient to avoid having frequent waiting by users attempting to schedule user requests on the "ADMF request queue". An alternative embodiment can provide software notification of long wait conditions on software requests that may experience such a wait.

An implementation of this invention may embody it into the I/O OS control software of a computer system. This may be done by modifying the IO programming in the OS to contain the ADMF processes described herein, for providing the software user interface to the hardware ADMF through the OS.

No I/O channel program needs to be involved in an ADMF operation, since the AOB replaces the channel program and controls the ADMF operations.

Building the UCB Queue

The processes in FIGS. 2, 3A and 3B build the UCB queue and make a one-to-one association between each ADMF UCB in the UCB queue and a respective ADMF subchannel (SCH) previously provided for the ADMF in a prior initialization of the computer hardware.

The SCHs are hardware internal code constructs, which cannot be accessed by software, which is why each SCH has a corresponding UCB provided which can be accessed by software. However, the architecture of the S/370 and S/390 systems provides a special control block for hardware/software communication with any SCH, and it is called a SCHIB (SubChannel Information Block). The SCHIBs are used by the processes in FIGS. 2, 3A and 3B to communicate with the SCHs in order to be able to obtain the SCH information needed to construct an ADMF UCB for each ADMF SCH. Thus, SCHIBs are well known in the prior art and are described in the IBM S/390 Principles of Operation (previously cited herein). A different SCHIB is used in each iteration of the process in FIG. 2 that detects an ADMF SCH.

The process in FIG. 2 presumes that a plurality of SCHIBs (SubCHannel Information Blocks) have been provided when entered at step 21. Step 22 executes a "store subchannel" (STSCH) instruction for each iteration of the process. The STSCH instruction stores the content of the currently identified SCH into an identified SCHIB, starting with SCH identifier 0 and increasing by one until the highest possible subchannel identifier (SCH ID) is reached, which is 65,535 for a system using the S/390 architecture. Step 23 tests for the last SCH ID of 65,535 and takes its yes path if it is reached to end the process in FIG. 2. For SCH IDs less than 65,536 the no path is taken to step 24.

Step 24 tests the SCH type field stored in this SCHIB to detect if the represented SCH is an ADMF SCH or an I/O SCH. The yes path is taken to step 27 if it has the ADMF SCH type, and the no path is taken to step 26 if it has the I/O SCH type. The yes path detects the SCHIB as an ADMF SCHIB, and then step 27 writes into the current SCHIB the current SCH number (last incremented by step 28). Step 27 also copies the detected ADMF SCHIB as a next element in a stack of ADMF SCHIBs.

If the no path is taken from step 24, the SCHIB is an I/O SCHIB, and no processing is done to it for the purposes of this invention. However, conventional I/O processing may be done to it in step 26.

The next step 28 is entered from either step 26 or 27 and it increments the current SCH ID by one to provide a new subchannel to be examined. A branch is then taken back to step 22 to start the next iteration of the process in FIG. 2 for this SCH ID.

Every SCH in the system is queried by looping a STSCH (store subchannel) instruction through every possible SCH identifier, and testing the SCH type field to detect all SCHIBs having the ADMF type. When step 23 finds the highest SCH number has been reached, the processing in FIG. 2 has completed the stack of ADMF SCHIBs, since it now represents all of the ADMF SCHs in the computer system.

The process in FIGS. 3A and 3B uses the ADMF SCHIBs in the stack to generate the UCB queue. When FIG. 3A is entered, Step 32 examines the SCHIB stack for being empty, and if empty takes the yes path to FIG. 3B. If step 32 finds the SCHIB stack is not empty, the no path is taken to step 33 which removes the first ADMF SCHIB from the stack. The next step 34 takes the removed SCHIB and builds a UCB element for the UCB queue. The UCB is a control block which has: a SCH ID field which contains the SCH number of the corresponding SCHIB, a "next UCB pointer" field, and active pointer field. Also, the UCB may receive other information available in its associated SCHIB. The UCB may, in an alternative embodiment be the SCHIB with the added pointer and flag fields.

Then step 35 determines if this UCB is the first UCB created for the UCB queue. If this is the first UCB, the yes path is taken to step 35A to make it the anchor element for the ADMF UCB queue, which is done by: 1. putting an address to this anchor UCB in a fixed location known to the operating system; 2. reserving an anchor pointer in the first UCB as an address for locating the first ADMF request element (ARE) to be put on the ADMF request queue; and 3) putting its own address as the next UCB pointer.

FIG. 3B is then entered at point A from the no path of step 35, or at point B from step 35A. When point A is entered, the current UCB is not the first UCB in the queue, and step 36 is performed which inserts the address of the current UCB into the next pointer field of the last-generated UCB to chain the current UCB into the UCB queue. Also, the next pointer field of the current UCB is set to the address of the anchor UCB. Then, step 37 is entered to associate this UCB with its SCH. Point B also enters step 37 without the chaining operation of step 36 for the first UCB.

Step 37 associates the current ADMF UCB with the subchannel it represents by executing a "Modify Subchannel" (MSCH) instruction, which writes into the SCH an interruption parameter that includes the UCB address of the current UCB. (The UCB address in the SCH forms an association between the UCB and the SCH which is enforced when the ADMF hardware facility completes work for a request using that SCH. Then the ADMF generates an interruption signal which copies the UCB address in the SCH into a fixed memory location known to the OS. The OS then uses the copied UCB address to access the UCB associated with the same request in the UCB queue.)

The next step 38 tests the SCHIB stack to determine if it has become empty. If yes, the UCB queue is built, and the build process is ended at step 39. If step 38 finds the SCHIB stack is not empty, the no path to step 38A in FIG. 3A is taken through point C to continue the build process.

Step 38A removes the next SCHIB from the ADMF SCHIB stack, and re-enters step 33 to build the next ADMF UCB in the build process. The build process continues to loop through step 32 until its yes path is taken to step 39 in FIG. 3B which ends the UCB queue build process.

User Interface to ADMF Operations

After the UCB queue is built, the ADMF software interface of the preferred embodiment is ready to be used by the users of the computer system. This software interface receives all ADMF requests from users. In this embodiment, each user request may include up to K number of non-contiguous variable-length page move requests in the same direction between two different virtual address spaces. These address spaces are herein called a "hiperspace" and a "user address space". Hiperspaces are disclosed and claimed in prior-filed U.S. Pat. No. 5,159,677 (PO9-88-020). Multiple address spaces are disclosed and claimed in prior-filed U.S. Pat. No. 4,355,355 (PO9-79-012), both assigned to the same assignee as the subject application.

In this embodiment, a user address space and a hiperspace are each defined as being a virtual address space of up to 2 Giga-Bytes comprising a contiguous sequence of 4 Kilo-Byte pages capable of holding data. Any page in the virtual address space may or may not contain any data. An empty virtual page does not need to be backed by any real page frame on a real medium, such as electronic memory or an electro-mechanical disk. Each virtual page containing data must be backed by a real page frame in either main storage (MS), expanded storage (ES), or DASD. A backing page of data for a hiperspace must be in either ES or DASD, and it cannot be in executable storage (MS in this embodiment). However, a user address space has its pages containing any data backed by real pages in executable memory (MS) when they are accessed.

The move direction is either from the hiperspace to the user address space (herein called the "read" hiperspace direction in which the hiperspace is the "source" of the page moves). Or is from the user address space to the hiperspace (herein called the "write" hiperspace direction in which the hiperspace is the "destination" or "sink" of the page moves).

A user request for service by the ADM Facility may be invoked by a user macro contained in a user program.

The user may be an application program or a supervisory program operating in problem or supervisory state. A user program may contain any number of ADMF requests for page moves.

Any single user ADMF transfer request may include up to K number of non-contiguous variable length transfers of contiguous pages between a hiperspace and the user address space. The number of non-contiguous transfers of pages in any single user request may be any number up to some stated maximum K, which is any number between 1 and 125 in the preferred embodiment. Each non-contiguous move can contain 262,144 contiguous page moves.

Each transfer involves the copying of pages from a source virtual space to a destination virtual space. Either may be the specified hiperspace or the user's address space, depending on the hiperspace read or write entry in the user request. In an alternative embodiment the read or write entry could be eliminated to allow each virtual address to determine the direction of the move. This would require each operand address to specify ALET as well as Offset within an address space. This would allow user address space to user address space and hiperspace to hiperspace moves as well as moves between the user space and a Hiperspace. The moved pages are not erased from the source space by the move operation.

Figure 8:
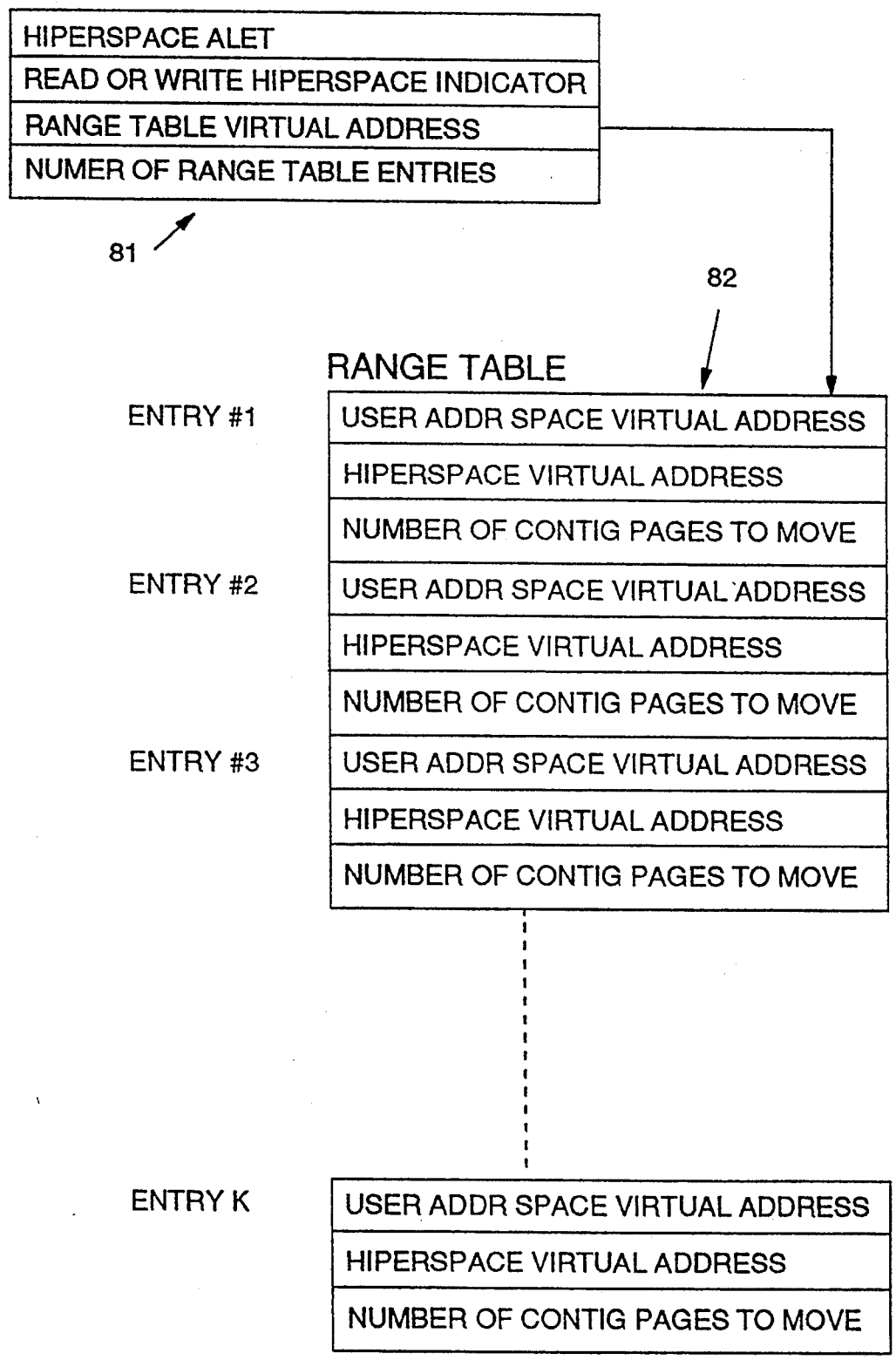
FIG. 8 represents a list providing a user software request for a transfer of pages between a Hiperspace and a user address space. The user request is used by the invention to build an AOB and associate the AOB with a UCB and an ARE.

An ADMF user supplies each request as a set of machine-readable parameter tables 81 and 82 of the type shown in FIG. 8. Each user of the ADM Facility is responsible for building the set of tables 81 and 82 shown for each ADMF request. Tables 81 and 82 use virtual addressing to specify what pages will be moved between a user address space and a hiperspace.

Figure 9:
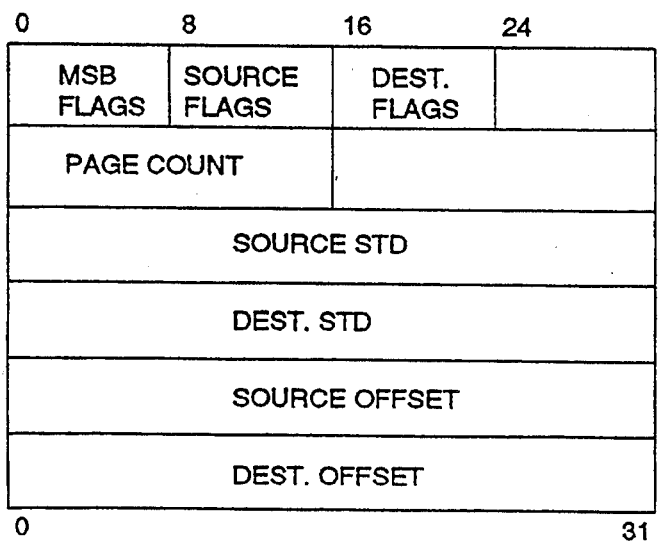
FIG. 9 shows the structure of an ADMF Move Specification Block (MSB).
Figure 10:
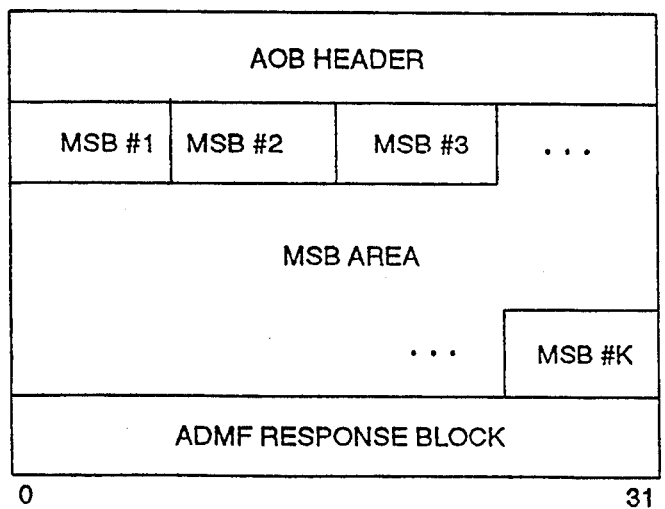
FIG. 10 shows the structure of an ADMF Operation Block (AOB).

The process in FIG. 4 converts the respective entries in table 82 into MSBs (move specification blocks) of the type shown in FIG. 9 and puts them into an ADMF Operation Block (AOB) of the type shown in FIG. 10. This process also appends an AOB header, and an AOB Response Block to the AOB.

Table 82 in FIG. 8 is a range table of up to K or 125 entries in the preferred embodiment. Each entry in table 82 is affected by all entries in an associated table 81.

The entries in table 81 include a hiperspace ALET (access list entry token) entry, a read or write indicator entry, a range list address entry, and an entry containing the number of entries in the range list table 82.

The user obtains the hiperspace ALET (access list entry token) from the OS and puts it into table 81.

The "user address space" is the user's ALET for the address space in which the user is presently executing, which it is known to the user.

The read or write indicator in table 81 specifies the direction for the requested data move operation. A write indication represents a move from the user address space to the hiperspace. A read indication represents a move from the hiperspace to the user address space.

The "range table address" entry in table 81 specifies the virtual address in the current user address space for locating the associated range list table 82.

The "number of range table entries" entry in table 81 specifies the K number of entries in table 82, each entry specifying a move operation of N number of pages contiguously located in virtual space.

In table 82, each entry contains a set of three fields in which the third field specifies a move of N number of contiguous pages in a transfer. The value in the second field in each entry specifies the hiperspace virtual address of the first page in the transfer of contiguous pages for the entry, whether the hiperspace is a source or destination of the move operation. The first field of each entry specifies the virtual address of the first page in the transfer defined by the respective entry for the contiguous pages being moved by the entry, whether the address is the destination or source of the move operation. The Read or Write indicator of Table 81 is used to place each operand of Table 82 into the proper position in the MSB of FIG. 9 to obtain the specified direction of the data move. In an alternative embodiment, each entry in the range table can contain a virtual or real address indicator for each operand. Supervisor or certain privileged programs using the ADMF may be aware of the real addresses to be operated upon. In such a case these programs can be given authority to specify real MS or ES address locations as operands of the ADM operation. In such an embodiment a test would be made in FIG. 4, Step 43 for a real or virtual address specification. The MSB Source and Destination Flags would be set accordingly.

User Request Processing

The process in FIG. 4 is executed after a user request provides tables 81 and 82 shown in FIG. 8. The invocation process may be executed in a user program containing a user macro having tables 81 and 82. The ADMF programming system service which processes the user macro is entered at step 41 in FIG. 4.

The process in FIG. 4 builds an AOB and an ADMF request element (ARE), and makes associations between the AOB and ARE that are needed to perform the request, and puts the ARE on the ADMF request queue. The process changes the user request into an AOB form which can be communicated to and used by the ADMF hardware.

The ADMF request queue contains all outstanding user requests for ADMF services which have not yet been completed by the ADMF hardware facility. At any given time, any number of ADMF user requests may have AREs on the ADMF request queue, and these AREs represent all uncompleted requests for ADMF service. (After the ADMF hardware completes its operations for any ARE and communicates the completion back to the software ADMF request queue, the associated ARE is removed from the ADMF request queue.)

The AREs may be put on the queue in any order, although they are put on the queue in first-in-first-out (FIFO) order in the preferred embodiment. The requests are performed in the ADMF hardware asynchronously and request completion by the ADMF hardware is independent of the order requests are put on the ADMF request queue and sent to the ADMF hardware.

In step 42, virtual address locations are assigned by the system service for storage areas in which an AOB and an ARE are to be generated to represent the current request. Step 43 builds the AOB from the parameter tables 81 and 82 provided by the user for the current request, and each entry in table 82 is converted into an MSB of the type shown in FIG. 9. This includes providing the storage keys to be used on data page accesses in the ADMF AOB Header table, FIG. 11. In an alternative embodiment where real or virtual address are supported, the source and destination flags of each MSB (FIG. 9) are set appropriately. In an alternative embodiment which is not restricted to moves between user space and a Hiperspace, the ALET of each operand is converted to the appropriate STD and supplied to the hardware in the MSB.

Step 43 in FIG. 4 builds the AOB from the entries in table 82, each entry being converted into a "move specification block" having the form shown in FIG. 9. Accordingly, as many MSBs are generated and put into the AOB as there are entries in the table 82. These MSBs may be put in the AOB in the same or reverse order, but any ordering of the MSBs will obtain the same page move result. The user address space and hiperspace virtual addresses in the entry are respectively written into corresponding source or destination offset fields in the MSB.

Also in step 43, MSB flags, source flags and destination flags are set into the MSB in the manner described in previously-cited applications Ser. Nos. 07/424,797, 07/816,917 and 07/012,187.

Furthermore, step 43 appends an ADMF Response Block (ARB shown in FIG. 12) contiguously with the AOB. The ARB will be used by the ADMF hardware to communicate back to the software ADMF request queue when the ADMF hardware has completed its work for this request.

Step 44 stores the AOB address into "AOB pointer" field in the ARE; this associates the AOB with the ARE which represents the work request.

Step 45 does ALET translation. (When a user supplies a virtual address in the form, ALET+OFF- SET, it may be represented in an MSB (move specification block) in any number of ways such as: an untranslated virtual address (ALET+OFFSET), a partially translated virtual address (STD+OFFSET), or an entirely translated Real Address. In the real address case, an indication of MS or ES must be made in the Source and Destination Flags. An STD contains an STO and STL (Segment Table Length). OFFSET is the number of contiguous virtual units (e.g. bytes or pages) from the beginning of the virtual address space (represented by the ALET) to an addressed unit; and STO (segment table origin) is a real address for locating the segment translation table.

The preferred embodiment partially translates the virtual address into the form, STD+OFFSET; the STD and offset are put into the MSB. Thus, in the general case, the build process translates each ALET (associated with the table 82 entries) into its STD and substitutes the STD for the corresponding ALET. The translation of the OFFSET virtual address in the MSB is done later in the hardware ADM Facility. The conventional OFFSET virtual address translation process uses segment and page tables located through the STO. In the preferred embodiment all operand specifications are virtual addresses, and all range table 82 entries contain an address in the user space and an address in the Hiperspace whose ALET is specified in Table 81. The STDs for these two virtual address spaces are supplied in each MSB in accordance with the setting of the read/write Hiperspace indicator of Table 81.

Accordingly, the hiperspace ALET in table 81 of the user request is translated into an STD and used for each ES operand of each page move operation. The OS obtains the user's current address space STD as the other operand for this page move operation. Which of these STDs represents the source, and which represents the destination of the move operation, is determined by the content in the "read or write indicator" field in the current table 81.

Step 45 places these STDs into the MSB source STD and destination STD fields as shown in FIG. 9.

In Step 45A in the preferred embodiment, storage protect keys are used by the computer system, and they are written into source (s) and destination (d) fields in word 4 in an AOB header shown in FIG. 11. Some computer systems do not use storage keys, and in such systems these AOB header fields are not used, or are used for other purposes. Source and destination flags are set to indicate address type. In this preferred embodiment, they both are set to virtual. Real address are also allowed.

Step 46 stores an address into the current ARE of a re-dispatch control block, which may be a task control block (TCB or SRB). A TCB or SRB is used by the OS in scheduling the execution of a user's processes, including the ADMF processes. The "active flag" in the ARE is set on from the time a UCB is assigned for it and remains on until the operation completion causes the ARE to be removed from the work queue.

The ARE and AOB (with AOB header and ARB) are now built and have been associated with each other. But the current ARE has not yet been put into the software ADMF request queue.

Step 47 is then performed to put the current ARE into the ADMF request queue. It starts by obtaining the location of the anchor ADMF UCB from a predetermined location in real memory, the anchor ADMF UCB is accessed, and its anchor pointer field is obtained to locate any first ARE in the ADMF request queue in a search of the queue to find a place at which to chain the current ARE into the queue. If the anchor pointer field in the anchor ADMF UCB is empty, the current ARE is made the first ARE in the ADMF request queue. If the active pointer field contains an ARE pointer, it is used to locate and access the first ARE in the ADMF request queue in a process of searching the ADMF request queue for its newest ARE previously put in the ADMF request queue. The search uses the "next element pointer" field in the currently accessed ARE to access the next ARE in the queue until the last (newest) ARE is indicated by a special value (such as all zeros) in its "next element pointer" field indicating it is currently the last ARE in the queue. The current (newly-built) ARE is then put into the queue by being chained from this last ARE. This is done by writing the address of the newly-built ARE into the "next element pointer" field in the last-found ARE to chain the newly-built ARE into the queue. The "next element pointer" in the newly-built ARE is set to the value (e.g. all zeros) previously in the "next element pointer" field in the last-found ARE to indicate the newly-built ARE is now the last ARE in the ADMF request queue. The previous element pointer is set to the address of the ARE to which the newly built ARE is being chained. The newly-built ARE is now a part of the ADMF request queue.

The next step 48 assigns a UCB to the ARE and its associated AOB, which is the first free UCB found which may be the first or any other UCB.

Figure 7A:
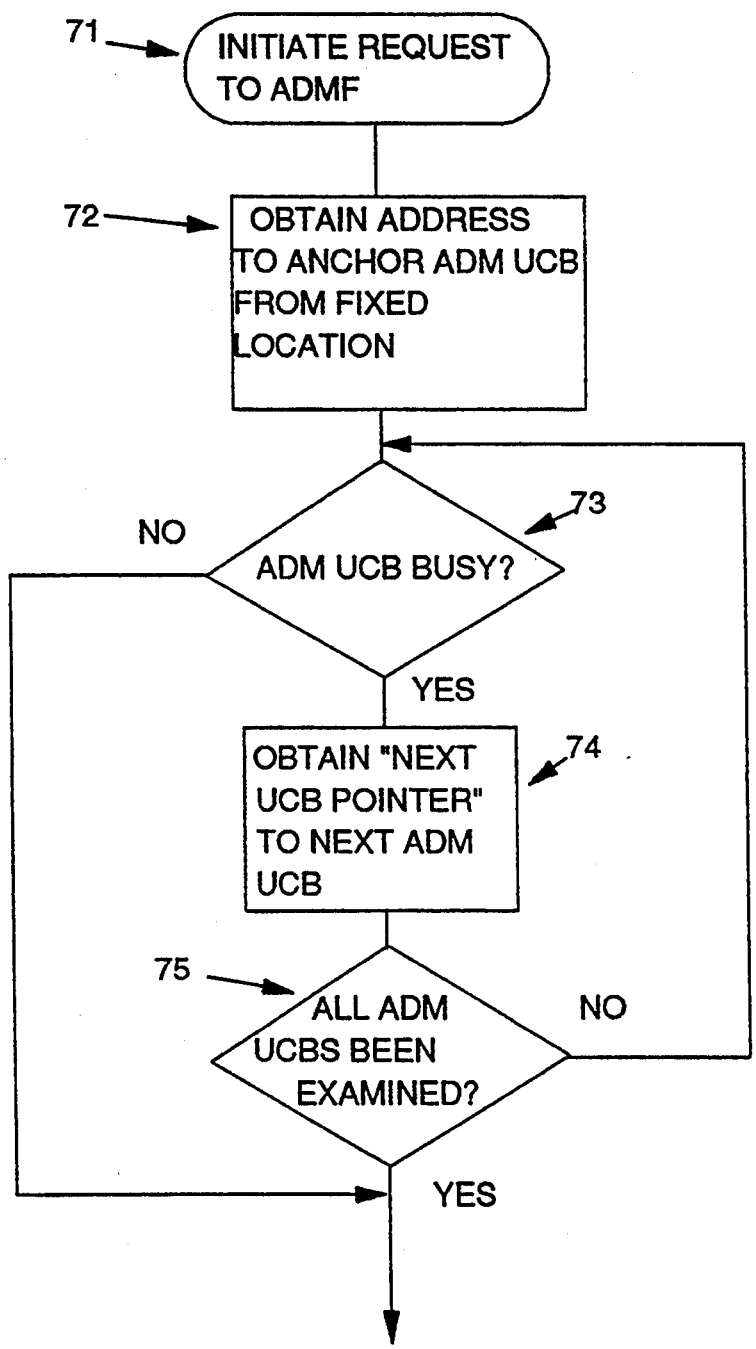
FIG. 7A and FIG. 7B together represent a flow chart of a process for finding a free UCB on the UCB queue, assigning that UCB to a user request, associating the UCB with an AOB built for the user request, and initiating an ADMF request to the ADMF hardware facility that provides the AOB to the ADMF hardware facility for defining the ADMF work to be done for the request.
Figure 7B:
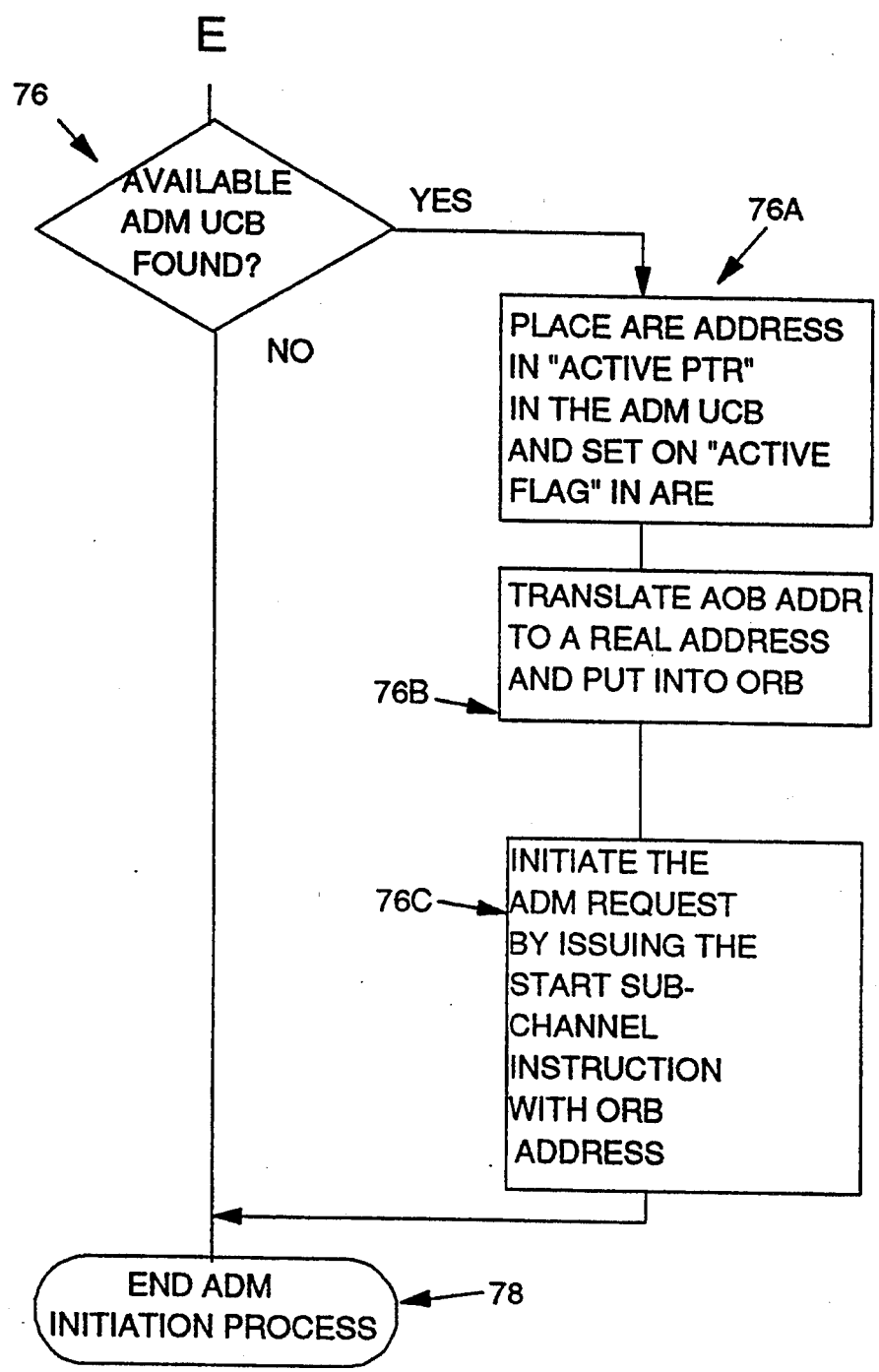

Then step 48 invokes the ADMF request initiation process shown in FIGS. 7A and 7B for sending the newly-built request to the ADMF hardware facility for processing. Before this can be done, the newly-queued ARE must be associated with an available UCB in the UCB queue. (It is to be noted that the first UCB in the UCB queue need not be associated with the newly-built ARE during the process of inserting the ARE into the queue; since the first UCB is only required to be used as an anchor (or base) UCB for locating the first ARE in the ADMF request queue.)

Figure 6:
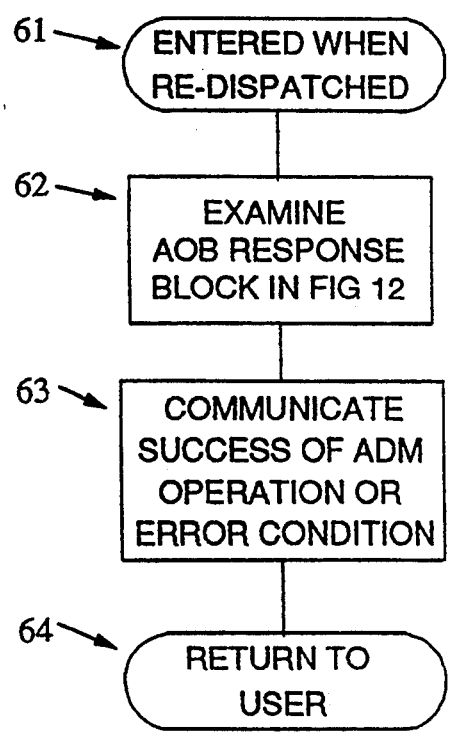
FIG. 6 is a flow chart of an asynchronous process to communicate to a requesting user of the resulting status indication of the performance by the ADMF hardware facility for the user's ADMF request which had invoked the interruption driven process in FIG. 5. The indication returned to the user indicates the request either had a successful completion or an abnormal error condition completion.

Step 49 sets a suspension flag in the re-dispatch control block (e.g. TCB or SRB addressed from the re-dispatch field in this ARE) to synchronize the next dispatching of a process represented in FIG. 6 for communicating back to the requesting user of the results of each completed request. This dispatching synchronization will prevent OS from dispatching the associated task for other work until the requested ADMF work is completed and available to the user.

ADMF Request Initiation Process

The ADMF request initiation process is invoked by step 47 in FIG. 4, or by step 57A in FIG. 5. These invocations occur whenever: 1) a new ARE is put on the ADMF software queue in the process in FIG. 4 and there is an available UCB to process it, or 2) a completed ARE is removed from the ADMF software queue in the process in FIG. 5, respectively.

The process in FIGS. 7A and 7B starts (initiates) operation of the ADMF hardware facility after an ADMF request element (ARE) is put on the software ADMF request queue. The currently oldest ARE on the ADMF request queue is started, because it is the first ARE found in a search from the anchor pointer in UCB 11. Initiating an ARE in the hardware ADMF involves putting the ARE on one of the associated ADMF internal queues; the ADMF internal queues were associated with all of the ADMF SCHs when the ADMF was initialized in prior-filed application Ser. No. 07/424,797 previously cited.

The ADMF initiation process in FIG. 7A begins by assigning (associating) an available UCB with the first (oldest) ARE found to have its active flag field set to an inactive state. A UCB must be associated with an ARE to enable the ADMF request (AOB) associated with the ARE to be communicated to the ADMF. The AOB associated with the ARE acts as a "letter" carrying the specifications of the user request to the hardware ADMF in this process. The UCB associated with this AOB "letter" is associated with an ADMF SCH (and through the ADMF SCH is associated with an ADMF internal queue). The UCB-to-ADMF SCH association was established in the process shown in FIG. 3B.

In more detail, step 72 obtains the address to the anchor UCB in the UCB queue from a fixed location known to the OS.

In the anchor UCB, "active pointer" field content is obtained, and tested. The search is ended at the first UCB found to have an inactive state in its active pointer field, and that UCB is assigned as the associated UCB this process.

The UCB queue search process follows the "next UCB pointer" in each accessed UCB and tests its "active pointer" for an inactive state; an inactive state indicates that UCB is a free UCB. The search uses each "next UCB pointer" in, for example, UCBs 11, 12, 13, etc. until a free UCB is found, or until all UCBs are found to be in the busy state.

When a free UCB is found, the process associates the free UCB with the current ARE being initiated.

Thus, in each accessed UCB, step 73 in FIG. 7A tests its free (available) state by testing the UCB's "active pointer" field; if it does not contain any pointer (e.g. contains all zeros), the UCB is free and available (if it does not indicate any error conditions). In this case control is transferred to Step 76 in FIG. 7B.

If test 73 finds the current UCB is not free, step 74 is entered to obtain the "UCB pointer" to the next UCB in the UCB queue (which then becomes the current UCB), and step 75 is entered. If step 75 finds the current UCB is not the last UCB, the no path is taken from step 75 to step 73 to repeat step 73 on the next UCB in the UCB search. If step 75 finds the current UCB is the anchor UCB, then all of the UCBs have been tested and the yes path is taken to step 76 in FIG. 7B at the end of the search.

If step 76 indicates that no free (available) UCB was found, its no path is taken to exit 78 to end the request initiation process, and no request initiation occurs.

But if step 76 finds an indication that an available and error-free UCB was found by step 73, the yes path is taken from step 76 to step 76A. Step 76A obtains the current ARE address (stored by step 47 in FIG. 4 or Step 57 of FIG. 5) and copies the ARE address into the "active pointer" field in this UCB, which then indicates a busy (non-available) state for the UCB.

Then, step 76B translates the AOB virtual address (which is in the user's virtual address space) in the "AOB pointer" field in the current ARE into a real address, and this "translated AOB address" is stored in ADMF Operation Block Address field in an ORB (Operation Request Block) as shown in FIG. 15, which is now being constructed by Step 76B An ORB is defined in the well-known S/370 architecture as the explicit operand of the "start subchannel" (SSCH) instruction used for starting operation of I/O devices. FIG. 15 describes the ORB format for ADMF SCHs. The Interruption parameter and operation controls are as described in ES/390 architecture. The interruption parameter is supplied in the ORD to the ADMF, which will report it back as part of the completion interruption for the operation to identify the UCB and SCH through which the operation was initiated. This allows the operating system to identify which operation request is completing. The ADMF Operation Block Address is used to pass the real address of the AOB from ADMF software to ADMF hardware. The OS must also provide the Storage Access Key in the Key field that allows the ADMF to access the AOB in user storage. The SSCH instruction has an implicit operand which is General Register 1 (GR1). (Before executing the SSCH instruction in the prior art, an ORB was constructed, and a GR1 memory area was set up for later loading into GR1.)

For step 76C, the GR1 area is set up by writing the "subchannel number" of the associated ADMF SCH into the GR1 memory area, and the ORB operand is set up in an ORB memory area by copying into it the AOB address in the "AOB pointer" field in the current ARE. The SSCH instruction has an operand that contains an address to this ORB area. Immediately before this SSCH instruction is executed by step 76C, GR1 is loaded from this GR1 memory area, as part of Step 76C, to indicate the addressed SCH.

The AOB address points to the AOB to be executed by the ADMF hardware. The AOB is shown in FIG. 10. The AOB contains an AOB Header, an MSB Area, and an ADMF Response Block. The AOB Header is shown on FIG. 11 and is described below. The MSB Area contains K MSBs and each MSB is described in FIG. 9 as described below. The AOB Response Block is shown in FIG. 12 and is described below.

FIG. 11 shows the AOB Header. The "Length" field contains the total number of bytes in the AOB. The "Command" field contains a high level description of what follows in the AOB. In this embodiment it specifies ADMF. New uses of the MSB Area and definitions of a new Response Block can be accomplished through different Commands in other embodiments. The "MSB Offset" field is a pointer to the first MSB to be executed. This allows programming to restart an operation in the middle of an MSB list, if it is required for recovery or reuse.

FIG. 9 shows an MSB format that is used with an AOB. Prior art describes an MSB format of a different form that was used with a channel program. The MSB contains three flag fields. The "MSB Flags" control Chaining of MSBs and Replication of a source page to many contiguous destination pages. "Source and Destination Flags" include a specification of the address type of the source and destination offset. The address types are either virtual, MS real or ESBN (Expanded Storage Block Number). A "Page Count" field contains the number of contiguous pages to move from the source to destination. If the MSB Flag indicates Replicate, the source page is replicated, page-count times at the destination. A "Source STD and Destination STD" are provided to qualify the Source and Destination Offsets provided. These STDs allow co-processors, running outside of the CPUs, to access translation tables set up by the operating system and translate the virtual offsets into real page addresses. The Source and Destination Offsets are pointers to the area where data pages will be read from and written to. These pointers are converted to real addresses based on the Source and Destination Flags.

FIG. 12 contains the AOB Response Block which is returned to the OS at the completion of the operation. The "Exception Flags" field contains completion status for the operation. The "Error MSB Offset" points to the last MSB executed and the "Page Count" field points to the page within the last MSB that was the last page moved or that ADMF attempted to move. The "Total Page Count" field contains a total count of all pages successfully moved by this operation. The "Source Address" and "Destination Address" reflect the offset of the last page moved or that ADMF attempted to move.

When step 76C executes the SSCH instruction, the processor in executing the SSCH instruction, puts the ADMF SCH (associated with the current UCB) on a hardware ADMF internal queue. (This is done in the manner explained in patent application Ser. No. 08/012,187 (PO9-92-063) which enables the ADMF to start executing the associated request. The association between an ADMF internal queue and the ADMF SCH was done when the ADMF was initialized, in which each ADMF SCH in the system was associated with a respective ADMF internal queue in the internal code (microcode) of the ADMF.)

The execution of the SSCH instruction makes the final connection between the software ADMF interface and the hardware ADMF interface for each user ADMF work request, by providing the interface whereby work assignment to a software UCB cab be related to the ADMF hardware work queues through the SCH.

Once a user work request (via an associated ADMF UCB) is put on an ADMF internal queue by means of a SSCH instruction to the associated SCH, the ADMF may move the work request (via its associated ADMF SCH) among its ADMF internal queues to balance the ADMF work load among its ADMF co-processors, in the manner described in application Ser. No. 07/012,187 (PO9-92-063), cited above.

When step 76C completes the SSCH instruction execution, the ADMF initiation process ends for the user ADMF request.

ADMF Request Completion

FIG. 5 represents an ADMF software process executed when the ADMF completes a request, in order to prepare the UCB queue and the ARE queue for subsequent use by future user ADMF requests, and make the TCB or SRB that made the request, ready for execution dispatch.

At any time, a number of parallel ADMF co-processors may be independently working on different user requests received from the software ADMF request queue via different start subchannel instructions executed by any of the CPUs in the system. Any user request may be completed by the ADMF without regard to when other user requests are completed by the ADMF. Hence, the ADMF completes its received requests in a manner which is independent of the order in which the software ADMF request queue is sending the requests to the ADMF.

Any CPU in the system may execute the process in FIG. 5, regardless of whether it is the same CPU or a different CPU from the CPU which executed the start subchannel instruction that sent the user request to the ADMF hardware.

Thus, if user requests are put on the software ADMF request queue in FIFO order, and if the start subchannel instructions for these requests are executed by step 76C in the order the requests are received by the ARE request queue, the ADMF completion of the requests may nevertheless have a different order for the reason that some user requests may move many more pages than other requests.

Upon the completion of each work request, the ADMF provides an I/O interruption signal to all CPUs in the system in accordance with S/390 architecture. One and only one CPU will accept interruption processing. The ADMF interruption signal stores two pieces of information: 1. the interruption parameter and 2. the identification number of the associated subchannel. The ADMF hardware facility makes this interruption information available to OS software by storing it into a predetermined memory location when the interruption is signalled by the ADMF hardware. Any CPU in the system enabled for I/O interruptions may accept and handle the interruption signal and execute the process in FIG. 5.

The interrupt-accepting CPU executes conventional OS interruption software, which makes the stored interruption information available (in a predetermined interruption information location) to entry step 51 in the ADMF software process in FIG. 5, which can then access the predetermined interruption area and initiate the execution of the process in FIG. 5.

Step 52 accesses the predetermined interruption area, obtains the interruption parameter which contains the UCB address associated with the completed operation and calculates the location of the "active pointer" in the same UCB. The ARE address is in this active pointer field. The ARE is accessed, and its active flag is reset to inactive state, which invalidates the content of its other fields. The ARE is removed from the work queue by processing its next and previous element pointers so that its next and previous neighbors now point to each other as previous and next AREs, respectively.

Then, step 53 zeros the active pointer(ARE Address) in the accessed UCB, which frees that UCB and makes it available for re-assignment to a new ADMF work request from any user.

Step 54 marks a suspension flag (in the TCB or SRB of the user associated with the completed work request) to enable the OS to re-dispatch the user to perform the process in FIG. 6 regarding communicating the results of the requested page move operation to the requesting user. This may occur on any CPU of the CEC (Central Electronic Complex).

Step 56 scans the ADMF request queue for another request which has not been started in the ADMF. The scan starts by accessing the anchor UCB to start a search of current AREs in the ADMF request queue (in the manner previously explained herein). Each succeeding ARE is accessed in the queue until an ARE is found containing an active field set to an inactive state, which indicates the request (associated with the ARE) has not been started in the ADMF, or until all AREs have been scanned and no inactive ARE is found.

Step 57 tests if the search found any ARE needing to be started. If no inactive ARE is found, the no path is taken to step 58 to end the processing for the interruption signal.

If step 57 finds an inactive ARE, its yes path is taken to step 57A to invoke the ADMF Request Initiation Process in FIGS. 7A and 7B for the pending ARE. Then the processing in FIG. 5 is ended at step 58.

Completion Response to User

Normal completion and any exceptions which occur during an ADMF operation are indicated in an ADMF Response Block (ARB), which is part of the AOB illustrated in FIGS. 10 and 12 when ADMF interruption signalling is provided as a result of an error condition being detected during an ADMF operation. Any of the CPUs in the system enabled for I/O interruption may accept the I/O interruption and invoke OS for handling the interruption. OS examines interruption status information in the ARB for extraordinary indications that OS must handle, and does so if required.

Intercommunication between OS software and ADMF hardware involves the AOB response block, a Subchannel Status Word (SCSW), and an Interruption Response Block (IRB). If no exception condition is found in the SCSW, control of the CPU is passed to the ADMF Service program which examines the provided ARB for an exception conditions that OS must handle first if any are found to exist. If none are found, CPU control is returned to the user program, which may begin further execution.

Step 61 is entered in the process in FIG. 6 to provide the ADMF software service of the currently completed ADMF request with completion status.

Step 62 examines the ARB for exception conditions for any it should handle.

Step 63 provides a return code to the user based on analysis of information provided in the ARB.

Finally, step 64 returns the CPU operations to the user for further processing.

Synchronization of ES Page Invalidations

Figure 14:
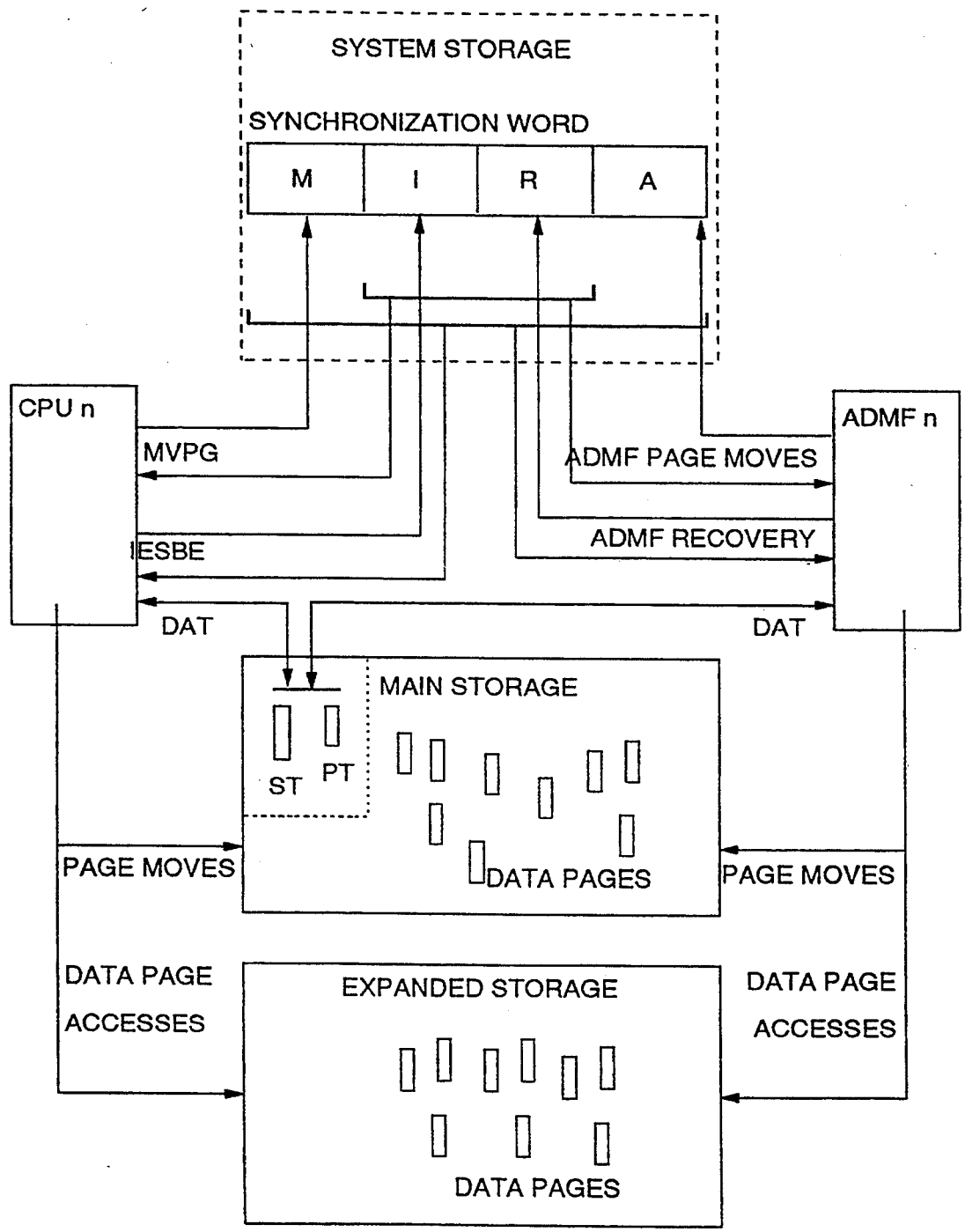
FIG. 14 shows a synchronization word used in the preferred embodiment.

The synchronization provided by FIG. 14 prevents a system error condition from being caused if an ES page is invalidated by the OS on a CPU while it is being moved by another CPU or by an ADMF co-processor. A "synchronization word" is used to delay the invalidation of an ES page by a CPU while the page is being moved by any another processor in the system (e.g. another CPU or ADMF co-processor). This prevents reassignment of an ES page to another use while a move is in progress and is required to protect data integrity.

The synchronization word is accessed at the beginning of execution of an IESBE (Invalidate ES Block Entry) instruction which identifies a virtual page address backed by ES to be invalidated. The IESBE instruction is supported by hardware and/or internal code (microcode) in each CPU.

The synchronization word contains four fields: M, I, R and A.

The bits in the M-field are respectively associated with the CPUs in the system. Each M bit is set on by its associated CPU at the beginning of execution of a move page (MVPG) instruction by the associated CPU only if all I and R bits are zero. The instruction execution waits until this condition is true. The M bit is set off at the end of execution of the move page (MVPG) instruction.

The bits in the I-field are also respectively associated with the CPUs. Each I bit is set on by its associated CPU at the beginning of execution of an IESBE instruction by the associated CPU. The I bit is set off at the end of execution of the IESBE instruction when all M and A bits become zero.

The bits in the A-field are respectively associated with the ADMF co-processors to indicate when each co-processor is currently performing a page move to or from ES. Each A bit is set on at the beginning of a page move by the associated ADMF co-processor but only if all I and R bits are zero. The co-processor waits until this condition is true before starting any page move involving ES. The A bit is set off at the end of each page move by the associated ADMF co-processor. Therefore each A bit is in an off state between page move operations by its associated ADMF co-processor.

The bits in the R-field also are respectively associated with the ADMF co-processors. Each R-bit respectively indicates an on state when its associated co-processor has an error recovery procedure underway. It is possible that a co-processor failed while in the process of moving an ES page, and did not complete the page move operation. Each R-bit is in the off state when its associated co-processor does not have any error recovery procedure underway.

Accordingly, the respective bits in the synchronization word are being turned on and off by the conditions described in the previous paragraphs.

The IESBE instruction has a low frequency of use in a system. Each time any CPU starts executing an IESBE instruction, and immediately after the processor turns on its I bit, it tests the state of all M & A bits in the synchronization word to determine if any bit is set on (which indicates that some processor is in the process of moving an ES page. If any M or A bit is on, the IESBE instruction is delayed by its CPU support internal code until all M & A bits are zero, after which the CPU completes the IESBE instruction.

Note that no M or A bit can be newly set on while an I-bit or R-bit is on, which allows the IESBE instruction and ADMF recovery processes to complete in a reasonable time. This objective is supported by setting the A-bit off after each page move of an ADMF multiple-page operation.

To avoid the use of the synchronizing IESBE instruction, a lock bit (L) was defined in a valid ES PTE in MVPG prior art shown and described in application Ser. No. 07/424,797 (PO989018). The L bit is set by CPUs or ADMF co-processors after setting their M or A bits to indicate to the OS that the ES page represented by this PTE is being moved. As OS can then use the Compare and Swap instruction to invalidate the page if the L bit is off. If the L bit is on, the IESBE instruction must be used to invalidate the page in the synchronized way.

ADMF co-processors must turn on the L bit also before moving an ES page to inform the OS that a processor in the system is actively moving a page in which case IESBE should be used to invalidate that page. The ADMF use of the synchronization word provides the mechanism by which IESBE waits for ADMF co-processors to complete paging activity.

ADMF co-processors turn on the R bit during recovery operations to re-synchronize all CPU and ADMF co-processors with respect to paging. Once an R bit is set, all paging activity will eventually stop, the co-processor can initialize control information and turn off the R bit to resume all paging activity. The R-bit delays initiation of all MVPG instructions by the CPUs of the CEC, as well as page moves by other co-processors of the ADMF. This will delay doing a specified move until all R-bits and I bits are in the off state.

Having thus described the invention in terms of preferred embodiments thereof, those skilled in the art will recognize that the invention can be practiced with modifications thereof within the spirit and scope of the claims.

Having thus described our invention, what we claim as new and desire to secure by Letters patent is:

1. A method of controlling a hardware data move facility (ADMF) by user programs in a data processing system containing a main memory and an extended memory, both memories being made of electronic technology media, said system including one or more central processors (CPUs), and said ADMF containing one or more ADMF processors, said method handling multiple concurrent requests from independent user programs to an operating system (OS) for services of said ADMF comprising the steps of providing ADMF requests in user programs to said OS, each ADMF request, including:

a page move table containing one or more data move specifications for moving data between two virtual address spaces, each data move specification containing a source virtual address and a destination virtual address for specifying locations of data to be moved for said ADMF request, and a parameter control list containing a backing indicator for signalling whether said virtual address spaces are backed by data on said same or different media, and a direction indicator for signalling a direction of data transfer relative to one of said address spaces, processing each user request by:

building an ADMF operation control block (AOB) by encapsulating said parameter control list and said page move table into a predetermined format of fields to provide an application-software-to-ADMF interface for each user program ADMF request, assigning an ADM request element (ARE) to said ADMF request and writing in said ARE an AOB pointer for locating said AOB in main memory to associate said ARE with said AOB, and chaining said ARE in an ARE queue containing currently uncompleted ADMF/OS requests, providing an ADMF unit control block (UCB) containing a subchannel identifier for identifying a subchannel associated with said ADMF and writing an ARE pointer in said ADMF UCB for with said UCB to locate said ARE and for associating said UCB with said ARE and with said AOB located by said AOB pointer written in said ARE, said UCB representing said ADMF request to said ADMF subchannel identified therein without associating said subchannel with a particular ADMF processor, chaining said UCB and ARE into an ADMF/OS queue containing an ADMF/OS queue header in said main memory by addressing said UCB and ARE through said ADMF/OS queue header, executing said method on a CPU to provide said application-to-ADMF interface utilizing said ADMF/OS queue for receiving and holding user program requests for ADM work and for transmitting said ADMF work requests from said ADMF/OS queue to an ADMF work queue in said ADMF, in which said OS is:

issuing each ADMF work request from said ADMF/OS queue by taking a UCB and an ARE addressed by said UCB from said ADMF/OS queue, and performing the step of:

forming an operation request block (ORB) as an operand of a start subchannel (SSCH) instruction and writing in said ORB said address of said AOB, executing said SSCH instruction by said OS to put said subchannel identified in said operand of said SSCH instruction on said ADMF work queue in said ADMF for providing an OS-to-ADMF interface for said ADMF request, and moving data for said ADMF request by said ADMF using any available ADMF co-processor to access said AOB for obtaining said data move specifications for identifying source and destination virtual address spaces and locating source and destination virtual addresses in said virtual address spaces to control movement of data between said locations.

2. A method of controlling a hardware data move facility (ADMF) by user programs as defined in claim 1, further comprising the steps of backing data in one of said virtual address spaces in said main memory of said data processing system and backing said other virtual address space in a random-access storage other than said main memory of said data processing system.

3. A method of controlling a hardware data move facility (ADMF) by user programs as defined in claim 1, further comprising the step of setting an active flag in said ARE to active state when said ARE is assigned an ADM UCB, and said active flag being in inactive state while said ARE is not assigned to any ADM UCB.

4. A method of controlling a hardware data move facility (ADMF) by user programs as defined in claim 1, further comprising the steps of generating an interruption signal by the ADMF upon completion or failure of an ADMF work request associated with said UCB, and storing an identification of said UCB and/or AOB associated with the UCB in a predetermined interruption location in said main memory;

accessing said UCB and obtaining said ARE pointer in said UCB to locate said ARE associated with said completed work by said ADMF signalled by said interruption signal; and removing said ARE from the ADMF request queue and freeing said UCB for use by another ADMF request.

5. A method of controlling a hardware data move facility (ADMF) by program users as defined in claim 4, further comprising the steps of returning to said user programs an indicator of success or failure of performance of ADMF work represented by said ADMF request of any said user program.

6. A method of controlling a hardware data move facility (ADMF) by user programs as defined in claim 1, further comprising the steps of generating a plurality of ADM UCBs for representing different ADMF subchannels, each ADM UCB being in a free state when said ADM UCB is not associated with any ADMF request by said user software program; and selecting a free ADM UCB for association with an ADMF work request by any said user program.

7. A method of controlling a hardware data move facility (ADMF) by user programs as defined in claim 6, further comprising the steps of
providing an anchor pointer in said ADMF/OS queue for locating each of said ADM request elements (ARE), and a first pointer in said ADMF/OS queue for locating a next ADM UCB, and a second pointer for locating said ADM UCB defined by said anchor pointer; and
providing an address to send anchor pointer in a predetermined location in one of said memories of said data processing system.

8. A method of controlling a hardware data move facility (ADMF) by user programs as defined in claim 7, further comprising the steps of
queuing each said ADMF subchannel associated with each said ADMF in response to said ADM UCB being selected for said ADMF request of any said user program.

9. A method of controlling a hardware data move facility (ADMF) by user programs as defined in claim 7, further comprising the step of
binding each said ADMF suchannel to an ADM UCB by writing in said ADM UCB an ADMF subchannel identifier for identifying said ADMF subchannel.

10. A method of controlling a hardware data move facility (ADMF) by user programs as defined in claim 1, further comprising the steps of
generating an AOB from a plurality of data move specifications provided in said data move table, and each said data move specification specifying a number of data blocks contiguously located in a virtual address space.

11. A method of controlling a hardware data move facility (ADMF) by user programs as defined in claim 1, further comprising the step of
providing only user virtual addresses in said parameter control list and said data move table for representing each ADMF request of any said user program.

12. A method of controlling a hardware data move facility (ADMF) by user programs as defined in claim 1, further comprising the step of
translating a virtual address of said AOB and putting a resulting translated AOB address in said ORB for said start subchannel instruction to enable queuing of said subchannel on said ADMF/OS queue.

13. A method of controlling a hardware data move facility (ADMF) by user programs as defined in claim 1, further comprising the step of
translating by said ADMF of virtual addresses in said AOB for performing an ADMF work request represented by said AOB.

14. A method of controlling a hardware data move facility (ADMF) by user programs as defined in claim 1, further comprising the steps of
appending an ADM response block (ARB) with each AOB when said AOB is being generated;
posting in said ARB by said ADMF of interruption data for indicating whether an associated ADMF work request is completed successfully or not, and whether any error condition was detected during performance of the ADMF work request; and
copying said ARB into a predetermined interruption area of storage when processing is ended by said ADMF for said ADMF work request.

15. A method of controlling a hardware data move facility (ADMF) by user programs as defined in claim 14, further comprising the steps of
also posting in said ARB by said ADMF of a count of data blocks moved for said ADMF work request.

16. A method of controlling a hardware data move facility (ADMF) by user programs as defined in claim 14, further comprising the steps of
also posting in said ARB of a storage location of any source and/or destination data block detected to having an error condition during said performance of an ADMF work request.

17. A method of controlling a hardware data move facility (ADMF) by user programs as defined in claim 1, further comprising the steps of
delineating in an header area of an AOB of a subset of contiguous data move specifications for execution by said ADMF when said AOB is being generated, in which the subset is equal to or less than all of said data move specifications in said AOB.

18. A method of controlling a hardware data move facility (ADMF) by user programs as defined in claim 2, further comprising the step of
providing a hiperspace as said other virtual address space backed by data blocks in said expanded memory (ES), transferring data blocks within or between the hiperspace and a user address space backed by data blocks in said main memory of said data processing system, each data transfer physically occurring within or between backing said memories although each data transfer is seen by each of said user programs as being within or between said hiperspace and said user address space.

19. A method of controlling a hardware data move facility (ADMF) by user programs as defined in claim 18, further comprising the step of
dividing all virtual address spaces, including all hiperspaces, and all backing data for said virtual addresses spaces into equal size pages for containing data blocks.

20. A method of controlling a hardware data move facility (ADMF) by user programs as defined in claim 1, comprising the steps of:
using virtual addressing in said data processing system for moving a page (data block) backed by a random-access storage (other than an execution storage) to prevent said page from being invalidated while being moved;
providing a synchronization field in a storage of said data processing system, said synchronization field containing a plurality of bit positions for each processor in said system, said plurality of bit positions for each processor indicating if said associated processor is in process of moving page or invalidating a page or of being in an error retry state;
inspecting said state of said synchronization field by any processor about to invalidate or move said page for an indication that another processor is in process of invalidating or moving said same or another page;
setting a bit position in said synchronization field (in atomic coordination with the other processors) prior to the processor invalidating or moving said page if no processor is indicated by said synchronization field is invalidating or moving said same or another page; and
invalidating or moving said page if no other processor is indicated in the synchronization field to be in a process of invalidating or moving said page.

* * * * *